(12) United States Patent
Silver

(10) Patent No.: US 10,589,177 B2
(45) Date of Patent: Mar. 17, 2020

(54) GLITCH FEATURE FOR USER EDITED VIDEO GAMES

(71) Applicant: JoyLabz LLC, Santa Cruz, CA (US)

(72) Inventor: Jay Saul Silver, Airmont, NY (US)

(73) Assignee: JOYLABZ, LLC, Santa Cruz, CA (US)

( * ) Notice: Subject to any disclaimer, the term of this patent is extended or adjusted under 35 U.S.C. 154(b) by 0 days.

(21) Appl. No.: 15/958,557

(22) Filed: Apr. 20, 2018

(65) Prior Publication Data
US 2019/0321729 A1    Oct. 24, 2019

(51) Int. Cl.
| | | |
|---|---|---|
| A63F 9/24 | (2006.01) | |
| A63F 13/00 | (2014.01) | |
| G06F 17/00 | (2019.01) | |
| G06F 19/00 | (2018.01) | |
| A63F 13/63 | (2014.01) | |
| A63F 13/52 | (2014.01) | |

(52) U.S. Cl.
CPC .............. *A63F 13/63* (2014.09); *A63F 13/52* (2014.09); *A63F 2300/6018* (2013.01)

(58) Field of Classification Search
USPC .............................. 463/20, 22, 25, 30, 31, 39
See application file for complete search history.

(56) References Cited

U.S. PATENT DOCUMENTS

| | | | | |
|---|---|---|---|---|
| 2008/0078758 A1* | 4/2008 | Shimura | ................ | A63F 13/10 219/717 |
| 2009/0131177 A1* | 5/2009 | Pearce | .................... | A63F 13/10 463/43 |
| 2009/0253517 A1* | 10/2009 | Bererton | ................ | A63F 13/12 463/42 |
| 2014/0256389 A1 | 9/2014 | Wentling et al. | | |

FOREIGN PATENT DOCUMENTS

| | | |
|---|---|---|
| JP | 2006087481 A | 4/2006 |
| JP | 5285010 B2 | 9/2013 |
| JP | 6075649 B2 | 2/2017 |

OTHER PUBLICATIONS

"Getting Started with Scratch," Version 2.0 Guide; Lifelong Kindergarten Group, MIT Media Lab (2013).
Kodu Game Lab Community; https://kodugamelab.com/ (17 pages) printed Oct. 27, 2018.
International Search Report and Written Opinion for Application No. PCT/US2019/020994, dated Jun. 21, 2019, 8 pages.

* cited by examiner

*Primary Examiner* — Adetokunbo O Torimiro
(74) *Attorney, Agent, or Firm* — Michael Best & Friedrich LLP

(57) ABSTRACT

An in-game video game editing system and method is provided. An electronic processor executes a game software application to generate, on a display, a graphical gameplay interface including a plurality of sprites and a graphical editing panel listing predetermined modifications. The electronic processor receives a selection of one of the predetermined modifications ad determines a type of the predetermined modification. The type indicates whether the predetermined modification includes adding a new sprite or selecting an existing sprite. Based on the type, an existing sprite is selected from the graphical gameplay interface. The electronic processor then adds a block of code to the selected sprite based on the predetermined modification to generate a modified sprite, and executes the block of code to provide the modified sprite on the graphical gameplay interface.

18 Claims, 25 Drawing Sheets

GLITCH FEATURE FOR USER EDITED VIDEO GAMES

FIELD OF THE INVENTION

The present invention relates to systems and methods providing users the ability to manipulate gameplay and other features in various software applications through a set of selectable software modifications.

BACKGROUND

In some software game applications, also referred to as video games, users are able to customize the game they are playing. For example, some video games allow the user to specify what a character wears, what the character carries with them, and the abilities the character has. However, the in-game customizations allowed by modern video games are particular to each game and are pre-set by the game designer. A user who plays a first game cannot switch to playing a second game and expect that they will be able to modify the second game in the same ways that they can modify the first game. To customize the game beyond what is pre-set by the game designer, a user, outside of gameplay, must access and modify the complex software of the video game to revise relevant sections of code, which is beyond the capabilities of a typical user and, in some cases, prevented by security measures of software.

SUMMARY

In some embodiments described herein, systems and methods provide users the ability to modify software game applications, in-game, using software modifications that are applicable across various game applications. Accordingly, in some embodiments, an in-game software editor is provided to enable unique customizations of software game applications that are not tied to a particular game. For example, the user is able to select and modify the appearance and behavior of one or more sprites in a gameplay interface through use of an overlaid editing panel. The editing panel includes icons, each associated with different types of modifications (also referred to as a glitches or filters), that, for example, adjust one or more attributes of sprites on the gameplay interface and modify code of sprites included in the graphical gameplay interface. Embodiments described herein provide an intuitive software editor that does one or more of the following: introduces users to software programming, simplifies software customization, provides universal editing functions that are applicable across different software game applications, inspires creativity, and increases variety in gameplay.

In one embodiment, an in-game video game editing method is provided. The method includes executing, by an electronic processor, a first game software application to generate a first graphical gameplay interface including a first sprite on a display, the first game software application defining the first sprite. The electronic processor receives first gameplay input from a human interface device that controls gameplay of the first game software application on the first graphical gameplay interface. The method further includes modifying the first sprite based on a selection of a predetermined modification from a plurality of selectable predetermined modifications and updating the first graphical gameplay interface to include the modified first sprite. The method further includes executing, by the electronic processor, a second game software application to generate a second graphical gameplay interface including a second sprite on the display, the second game software application defining the second sprite. The electronic processor receives second gameplay input from the human interface device that controls gameplay of the second game software application on the second graphical gameplay interface. The method further includes modifying the second sprite based on a further selection of the predetermined modification from the plurality of selectable predetermined modifications and updating the second graphical gameplay interface to include the modified second sprite.

In another embodiment, an in-game video game editing system is provided. The system includes a human interface device, a display, a memory storing a first game software application defining a first sprite and a second game software application defining a second sprite; and an electronic processor communicatively coupled to the human interface device, the display, and the memory. The electronic processor is configured to execute the first game software application to generate a first graphical gameplay interface including the first sprite on the display and to receive first gameplay input from the human interface device that controls gameplay of the first game software application on the first graphical gameplay interface. The electronic processor is further configured to modify the first sprite based on a selection of a predetermined modification from a plurality of selectable predetermined modifications and to update the first graphical gameplay interface to include the modified first sprite. The electronic processor is further configured to execute the second game software application to generate a second graphical gameplay interface including the second sprite on the display and to receive second gameplay input from the human interface device that controls gameplay of the second game software application on the second graphical gameplay interface. The electronic processor is further configured to modify the second sprite based on a further selection of the predetermined modification from the plurality of selectable predetermined modifications and to update the second graphical gameplay interface to include the modified second sprite.

In another embodiment, another in-game video game editing method is provided. The method includes executing, by an electronic processor, a game software application to generate, on a display, a graphical gameplay interface including a plurality of sprites. The electronic processor receives a gameplay input from a human interface device for controlling gameplay of the game software application on the graphical gameplay interface and generates a graphical editing panel on the graphical gameplay interface. The method further includes receiving, from the human interface device, a selection of a predetermined modification included in the graphical editing panel. The electronic processor determines a type of the predetermined modification, wherein the type indicates whether the predetermined modification includes adding a new sprite and whether the predetermined modification includes selecting a sprite of the plurality of sprites on the graphical gameplay interface. In response to the type of the predetermined modification, receiving, from the human interface device, a selection of a sprite of the plurality of sprites on the graphical gameplay interface. The electronic processor further adds a block of code to the selected sprite based on the predetermined modification to generate a modified sprite, and executes the block of code to provide the modified sprite on the graphical gameplay interface.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
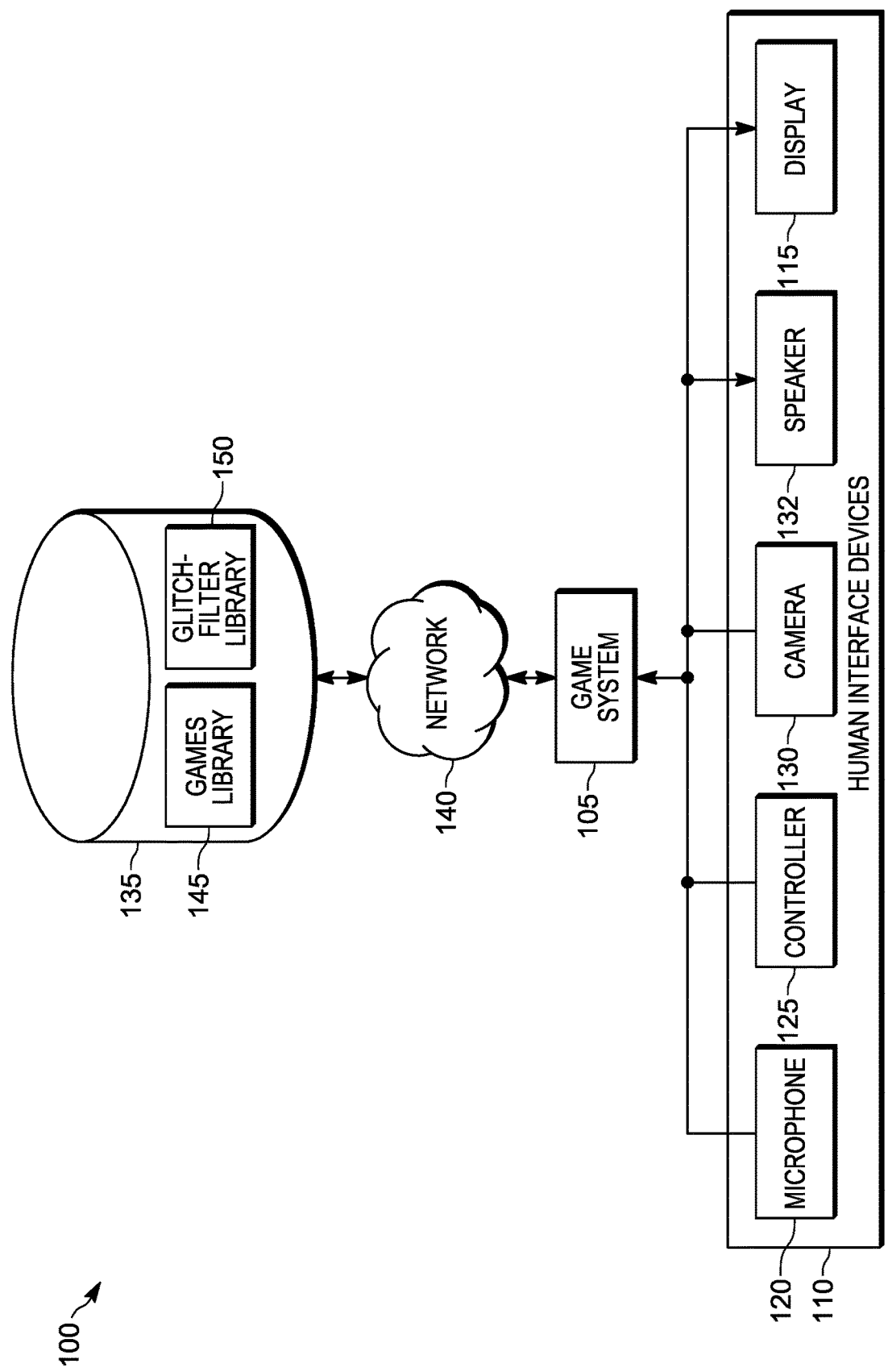
FIG. 1 is a block diagram of a game editing system.

FIG. 1 illustrates an in-game video game editing system 100. In the example illustrated, the game editing system 100 includes several hardware components including a game system 105 and one or more human interface devices 110. The human interface devices 110 include one or more of a display 115, a microphone 120, a controller 125, a camera 130, and a speaker 132. The components of the game editing system 100 may be of various constructions and may use various communication types and protocols.

The game system 105 may be communicatively connected to the display 115, microphone 120, controller 125, camera 130, and speaker 132 via various wired or wireless connections. For example, in some embodiments, the game system 105 is directly coupled via a dedicated wire to each of the above-listed components of the game system 105. In other embodiments, the game system 105 is communicatively coupled to one or more of the components via a wireless connection.

The game system 105 is configured to send information to and receive information from a remote server 135 via a network 140, which may be wired, wireless, or a combination thereof. For example, the information that may be sent from the remote server 135 and received by the game system 105 includes a games library 145 and a glitch-filter library 150. Although the remote server 135 is illustrated as one server, the remote server 135 may include a plurality of servers. Thus, the games library 145 and the glitch-filter library 150, while illustrated as being stored on one server, may be distributed amongst a plurality of servers making up the remote server 135.

Figure 2:
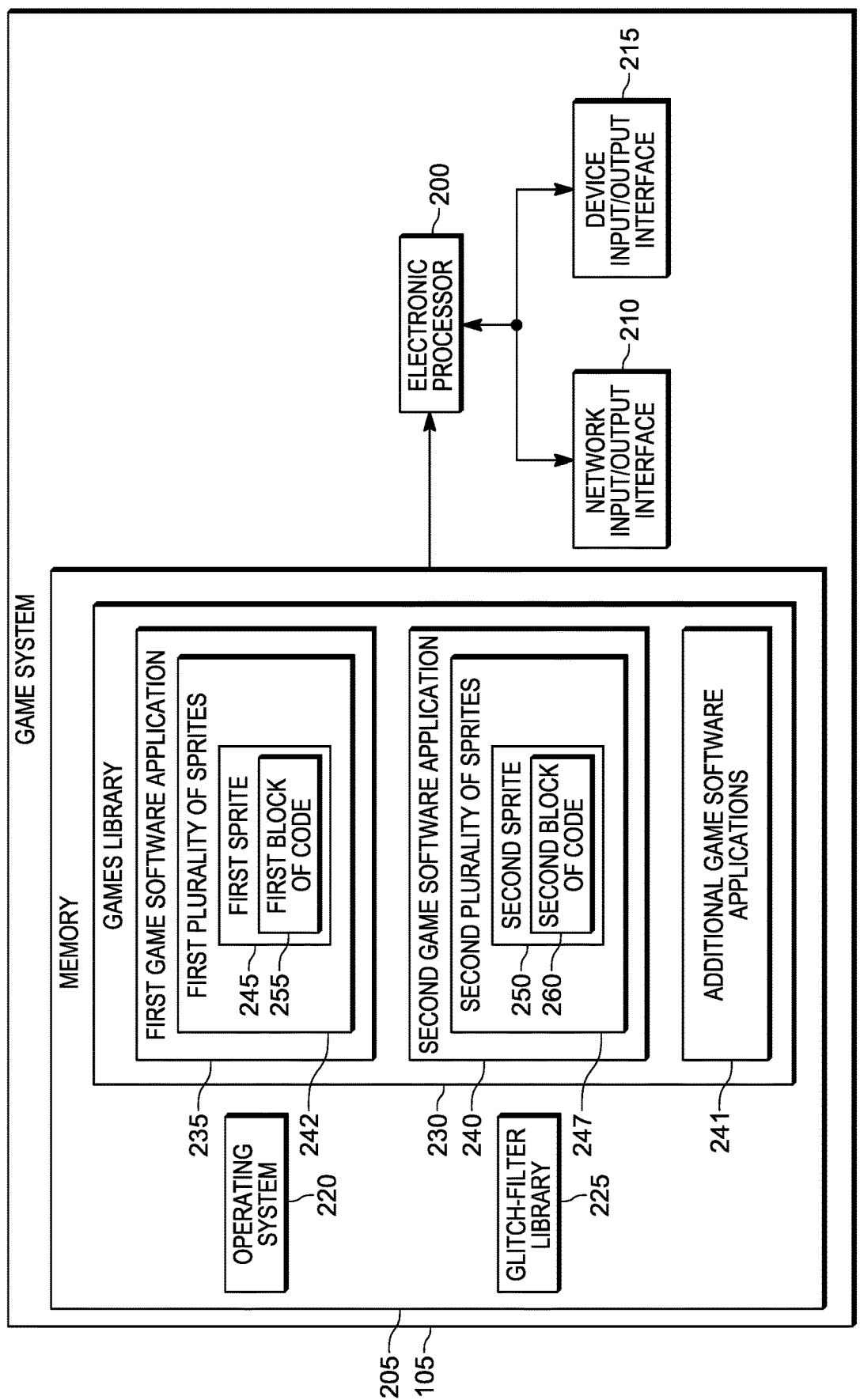
FIG. 2 is a block diagram of the game system of FIG. 1.

FIG. 2 is a block diagram of the game system 105. The game system 105 includes, among other things, an electronic processor 200, a memory 205, a network input/output interface 210, and a device input/output interface 215. The electronic processor 200 is communicatively connected to the memory 205, the network input/output interface 210, and the device input/output interface 215. The electronic processor 200, in coordination with the memory 205, the network input/output interface 210, and the device input/output interface 215, is configured to implement, among other things, the methods described herein.

The memory 205 includes an operating system 220, a glitch-filter library 225, and a games library 230. The games library 230 contains a plurality of game software applications including a first game software application 235, a second game software application 240, and additional game software applications 241. The first game software application 235 has a first plurality of sprites 242 including a first sprite 245. The second game software application 240 has a second plurality of sprites 247 including a second sprite 250. A sprite is an object that is displayed within a game play interface and that has a plurality of blocks of code. For example, a sprite may be a two dimensional bitmap (such as a JPEG) that is integrated into the graphical gameplay interface. A block of code of the plurality of blocks of code defines, for example, the appearance (physical attributes) of the sprite, behavior of the sprite, or both. For example, a block of code that defines the behavior of the sprite may cause the sprite to move upwards on the game play interface until the sprite touches another sprite on the game play interface. A block of code defining the sprite may also define a physical attribute of the sprite such as the color of the sprite. The glitch-filter library 225 includes glitches, filters, or both, which, as described in further detail below, are configured to provide a variety of modifications to sprites within a game software application.

The device input/output interface 215 is configured to enable the electronic processor 200 to communicate with the human interface devices 110 including the display 115, the microphone 120, the controller 125, the camera 130, and the speaker 132. The network input/output interface 210 is configured to enable the electronic processor 200 to communicate with the remote server 135 via the network 140. For example, the interfaces 210 and 215 may include one or more of driver circuitry, terminal connections, wireless transceivers, and signal processing circuits. The electronic processor 200 retrieves up-to-date versions of game software applications from the games library 145 on the remote server 135, such as one or more of the applications shown in FIG. 2. The electronic processor 200 caches the game software applications in memory 205 and executes the applications. The electronic processor 200 also retrieves from the games library 145 modified versions of game software applications that have been saved by the user, such as one or more of the applications shown in FIG. 2. The electronic processor 200 caches the modified versions of game software applications in memory 205 in order to execute them. The electronic processor 200 retrieves from the remote server 135 an up-to-date glitch-filter library 150 and caches the up-to-date glitch-filter library 150 in memory 205 as the glitch-filter library 225. The glitch-filter library 225 may also be referred to as a local glitch-filter library, and the game software applications in the games library 230 may be referred to as local game software applications. In some embodiments, the connection to the remote server 135 is not present and the game system 105 is an untethered, localized system. In some embodiments, the connect to the remote server 135 occurs periodically to update the system, such as by updating the glitch-filter library 225 and the games library 230 with new or modified glitches, filters, and games available at the remote server 135.

Figure 3:
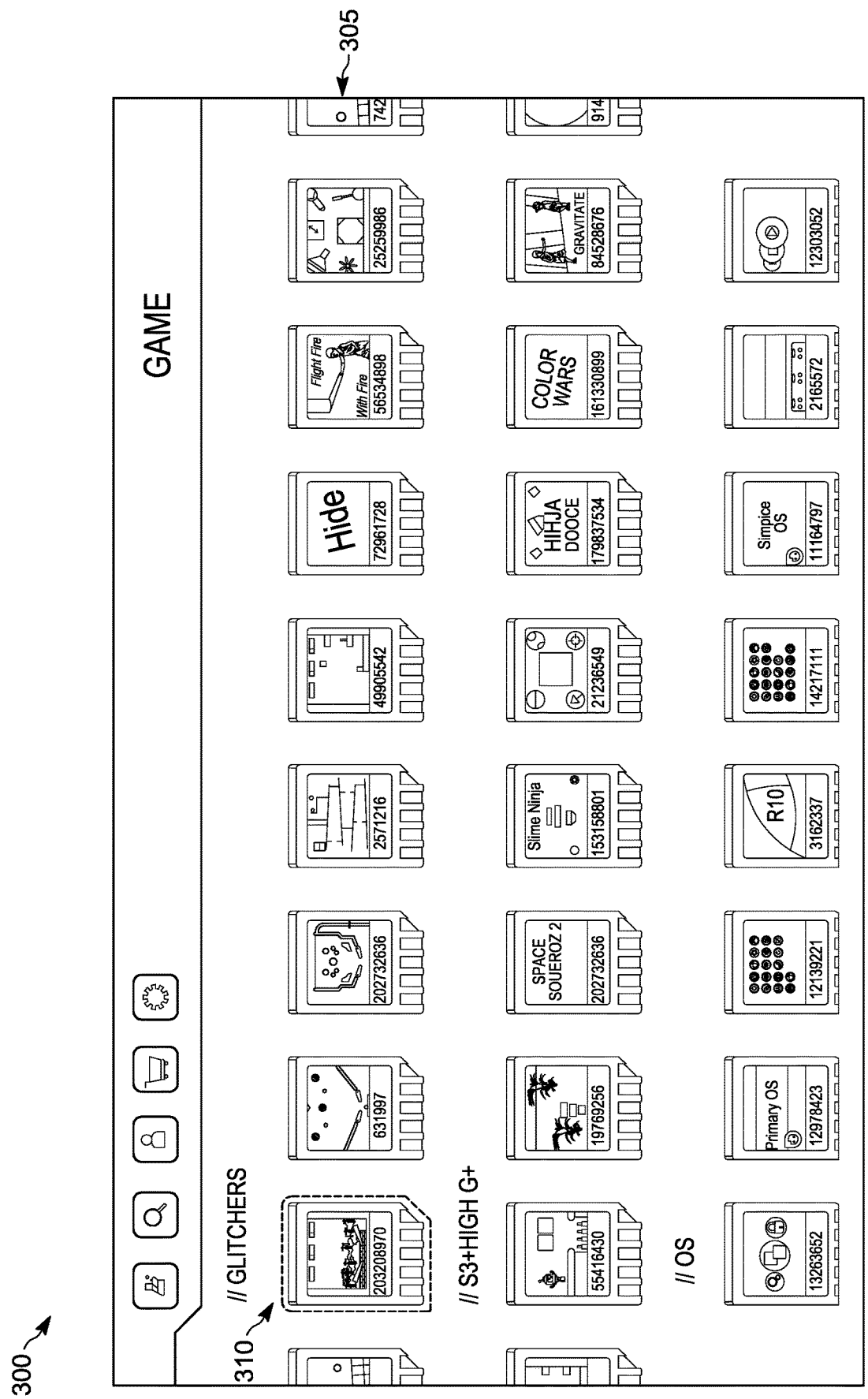
FIG. 3 is an illustration of the home screen of the game system of FIG. 1.

FIG. 3 illustrates a home screen 300 of the game system 105. Each ribbon (for example, ribbon 305) of a plurality of ribbons in the home screen 300 illustrates a group of games available for a user to select to play. Each game in a group of games is represented by a game icon. In the example illustrated, a dashed line around a game icon indicates that the game represented by the game icon is currently selected by the user (e.g., using one or more of the human interface devices 110). For example, a dashed line around the game icon 310 in FIG. 3 indicates that the game represented by the game icon 310 has been selected. In some embodiments, when the user selects a game, the electronic processor 200 displays on the display 115 the code the electronic processor 200 executes as the game is played.

Figure 4:
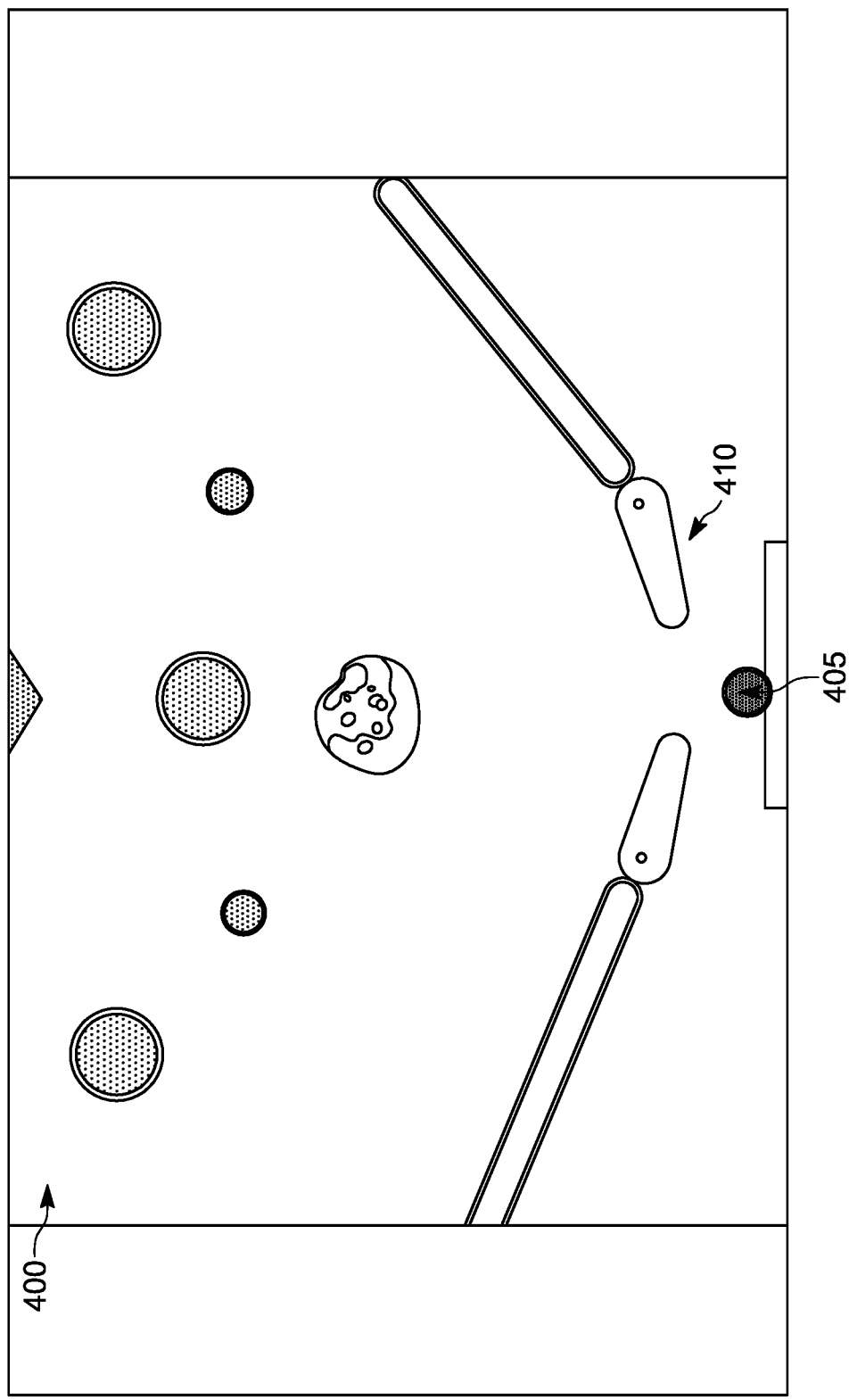
FIG. 4 is an illustration of a graphical gameplay interface of a game software application.

FIG. 4 illustrates an example of a graphical gameplay interface 400. The game system 105 generates the graphical gameplay interface 400 in response to receiving a user's selection of a game, via the human interface devices 110, on the home screen 300. More particularly, the electronic processor 200 retrieves, from the memory 205, and executes a game software application (e.g., the first game software application 235) to generate the graphical gameplay interface 400 and to display the graphical gameplay interface 400 on the display 115. The graphical gameplay interface 400, in this example embodiment, is for a pinball game. The graphical gameplay interface 400 includes several sprites, such as a sprite 405, illustrated as a ball. The graphical gameplay interface 400 further includes a sprite 410, illustrated as a paddle, that the user is controlling via gameplay input received by the electronic processor 200 from the human interface devices 110. The sprite 405 and the sprite 410 will be used in the following discussion to describe certain features of the invention. In some embodiments, code that the electronic processor 200 executes to display the graphical gameplay interface 400 is displayed within the graphical gameplay interface 400.

Figure 5:
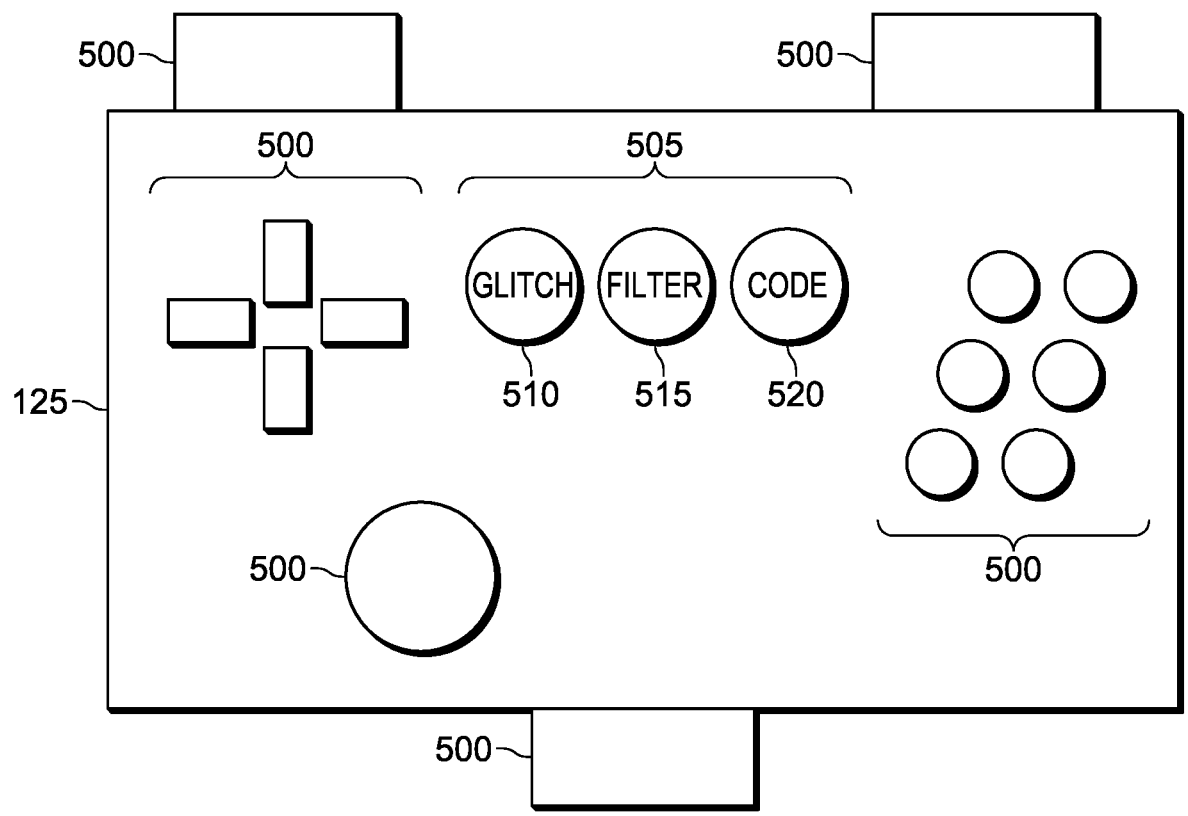
FIG. 5 is a block diagram of a controller of the game editing system of FIG. 1.

FIG. 5 illustrates the controller 125 of the game editing system 100. The controller 125, as illustrated, is a hand-held game controller 125 that includes gameplay input buttons 500 and editing buttons 505. The controller 125 includes an electronic processor configured to execute instructions stored on a memory of the controller 125 to carry out the functionality of the controller 125 described herein. The gameplay input buttons 500 and editing buttons 505 may be one or more of electro-mechanical pushbuttons, analog joysticks, capacitive touch buttons, directional pads, trigger-style buttons, soft buttons (e.g., on a touch screen), and other forms of user input elements. The electronic processor of the controller 125 detects the user input via the various buttons of the controller 125 (for example, by sensing a current signal provided by the buttons). In response to actuation of the buttons by a user, the controller 125 provides input to the game system 105 to navigate the home screen 300 (see, e.g., FIG. 3) and other screens, during gameplay (see, e.g., FIG. 4), during a glitch or filter application mode (see, e.g., FIG. 11), during a code editing mode (see, e.g., FIG. 10), and for other uses. The gameplay input buttons 500, when actuated by a user, cause the controller 125 to send gameplay input to the electronic processor 200. The editing buttons 505, when actuated by a user, cause the controller 125 to send editing input to the electronic processor 200. For example, in some embodiments, the editing buttons 505 include a glitch button 510, a filter button 515, and a code button 520. When the glitch button 510 is actuated, the controller 125 sends a command to the electronic processor 200 to display a graphical editing panel with the glitches the user can apply. When the filter button 515 is actuated, the controller 125 sends a command to the electronic processor 200 to display a graphical editing panel with the filters the user can apply. When the code button 520 is actuated, the controller 125 sends a command to the electronic processor 200 to display a code editing interface. In some embodiments, when the electronic processor 200 applies a glitch to a game the electronic processor 200 sends a signal to the electronic processor of the controller 125, causing the controller 125 to output an indication (such as a flashing light, a vibration, or a sound) that a glitch has been applied. It should be understood that the controller 125 described herein is merely illustrative and may include more or fewer gameplay input buttons 500 and editing buttons 505 than those described herein. For example, the controller 125 may include a single button that when actuated provides a user access to a graphical editing panel with glitches, a graphical editing panel with filters, and a code editing interface.

In some embodiments, the electronic processor 200 may receive input that commands the electronic processor 200 to associate an action performed by a user or a sound made by the user with a gameplay input button or editing input button on the controller 125. For example, the electronic processor 200 may receive input declaring that the electronic processor 200 should associate receiving an indication of a hand-waving motion from the camera 130 with receiving input from one of the gameplay input buttons 500 on the controller 125. Thereafter, when the electronic processor 200 receives an indication of a hand-waving motion from the camera 130, the electronic processor 200 behaves as it would if it received an actuation of a gameplay input button. In another example, the electronic processor 200 may receive input declaring that the electronic processor 200 should associate receiving an indication of a whistle from the microphone 120 with receiving input from one of the gameplay input buttons 500 on the controller 125. Thereafter, when the electronic processor 200 receives an indication of a whistle from the microphone 120, the electronic processor 200 behaves as if it received an actuation of a gameplay input button.

Figure 6:
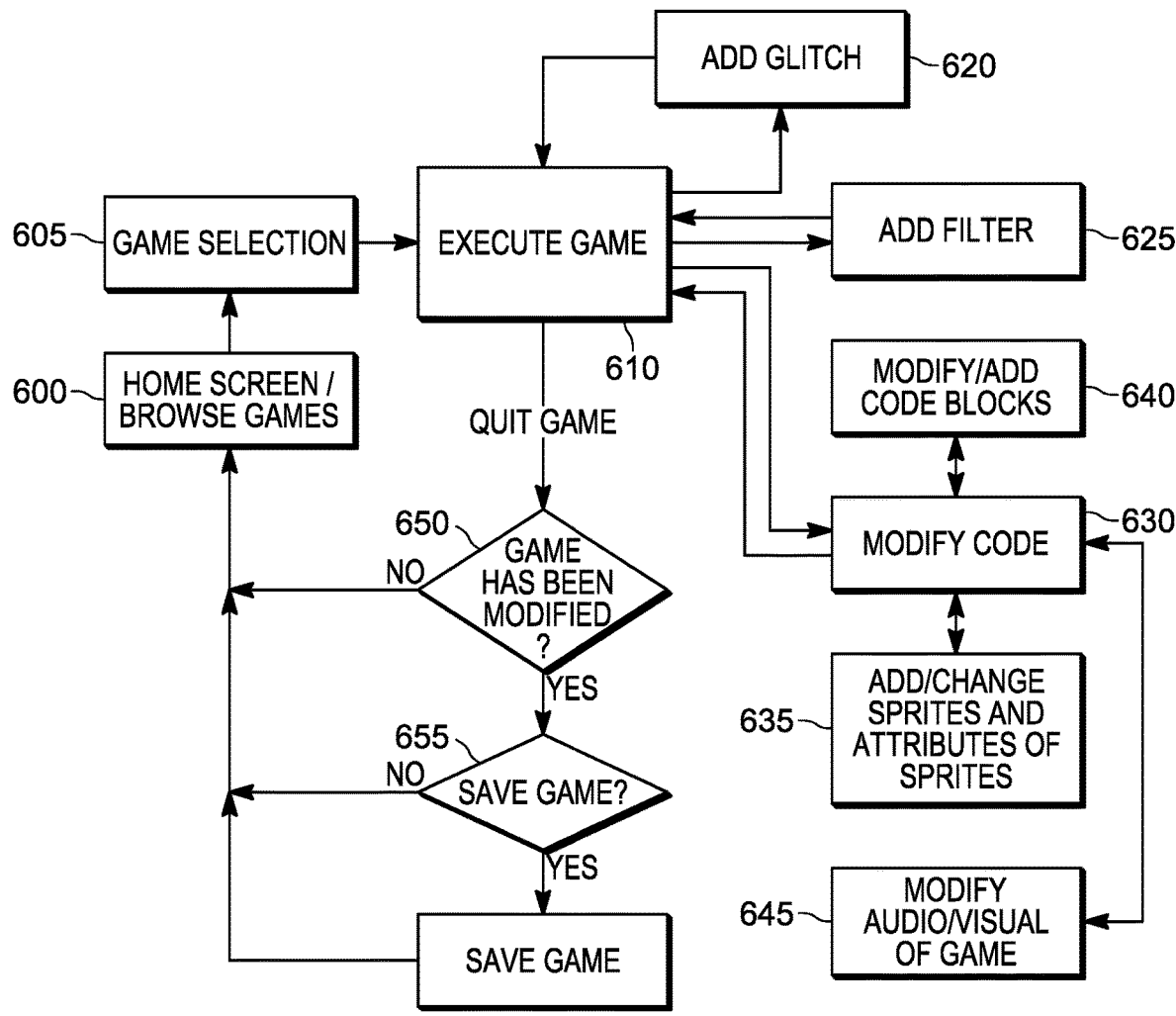
FIG. 6 is a flow chart for interacting with the game editing system.

FIG. 6 illustrates a flow chart for interacting with the game system 105. The flow chart begins in block 600 when the game system 105 powers on, and the electronic processor 200 generates and displays the home screen 300 on the display 115 (see FIG. 3). The home screen 300 includes a plurality of game icons illustrated in a plurality of ribbons, with each game icon being associated with a game software application. The electronic processor 200 populates each ribbon of the plurality of ribbons with game icons representing the game software applications stored in one or both of the games libraries 145 and 230. User browsing input is received at one or more of the human interface devices 110, such as the controller 125. The human interface devices 110 provide the user browsing input to the electronic processor 200, which cycles through the game icons displayed in the ribbon 305. In block 605, the electronic processor 200 receives browsing input from the human interface devices 110 indicative of a user selection of a game. In block 610, the electronic processor 200 executes the game software application associated with the selected game icon. Execution of the game software application includes generating a graphical gameplay interface for the selected game, such as the graphical gameplay interface 400. Execution of the game software application further includes receiving gameplay input via the human interface devices 110 and providing output to the human interface devices 110 as well as updating the graphical gameplay interface to enable gameplay (e.g., virtual pinball) in accordance with the particular selected game.

During execution of the game software application, modification input or quit game input may be received at one or more of the human interface devices 110, such as the controller 125, from a user. The human interface devices 110 provide the modification input or quit game input that was received to the electronic processor 200. The modification input may be a request to add a glitch (upon actuation of the glitch button 510), add a filter (upon actuation of the filter button 515), or modify code (upon actuation of the code button 520). The electronic processor 200 receives the modification input and proceeds to block 620 to add a glitch, to block 625 to add a filter, or to block 630 to modify code, in accordance with the request received. For example, in block 620, the electronic processor 200 displays a graphical editing panel with the glitches the user can select, receives user input, via the human interface devices 110 specifying a glitch, and applies the glitch specified. Similarly, in block 625, the electronic processor 200 displays the graphical editing panel with the filters the user can select, receives user input, via the human interface devices 110 specifying a filter, and applies the filter specified. Similarly, in block 630, the electronic processor 200 displays a code editing interface, receives user code editing input, via the human interface devices 110, as described below with respect to FIG. 11, and applies the code edits to the game software application. For example, the electronic processor 200 may receive code edits to perform one or more of: adding one or more sprites to a game or modifying one or more attributes of existing sprites (block 635), adding or modifying other code blocks (block 640), or modifying audio and visual features of the game (block 645). In response to the code edits received in blocks 635, 640, and 645, the electronic processor 200 saves the modified game software application locally in the games library 230 of the game system 105. After the game software application has been modified, depending on the received modification input, the electronic processor 200 returns to block 610 to execute the game software application.

In response to quit game input, the electronic processor 200 proceeds from block 610 to block 650. If the game software application has not been modified (e.g., via blocks 615, 620, 625, or 630), the electronic processor 200 returns to the home screen 300 in block 600. If, however, the game software application has been modified, the electronic processor 200 prompts the user (e.g., on the display 115) to indicate whether to save the modified game software application. In response to receipt of an indication not to save, the electronic processor 200 returns to the home screen 300 in block 600. In response to receipt of a request to save the game, the electronic processor 200 uploads the modified game software application to the games library 145 on remote server 135. In turn, the electronic processor 200 (and the electronic processors of other games systems 105 coupled to the remote server 135) will be able to retrieve the modified game software application for display on and selection from the ribbon 305 in the home screen 300.

Figure 7:
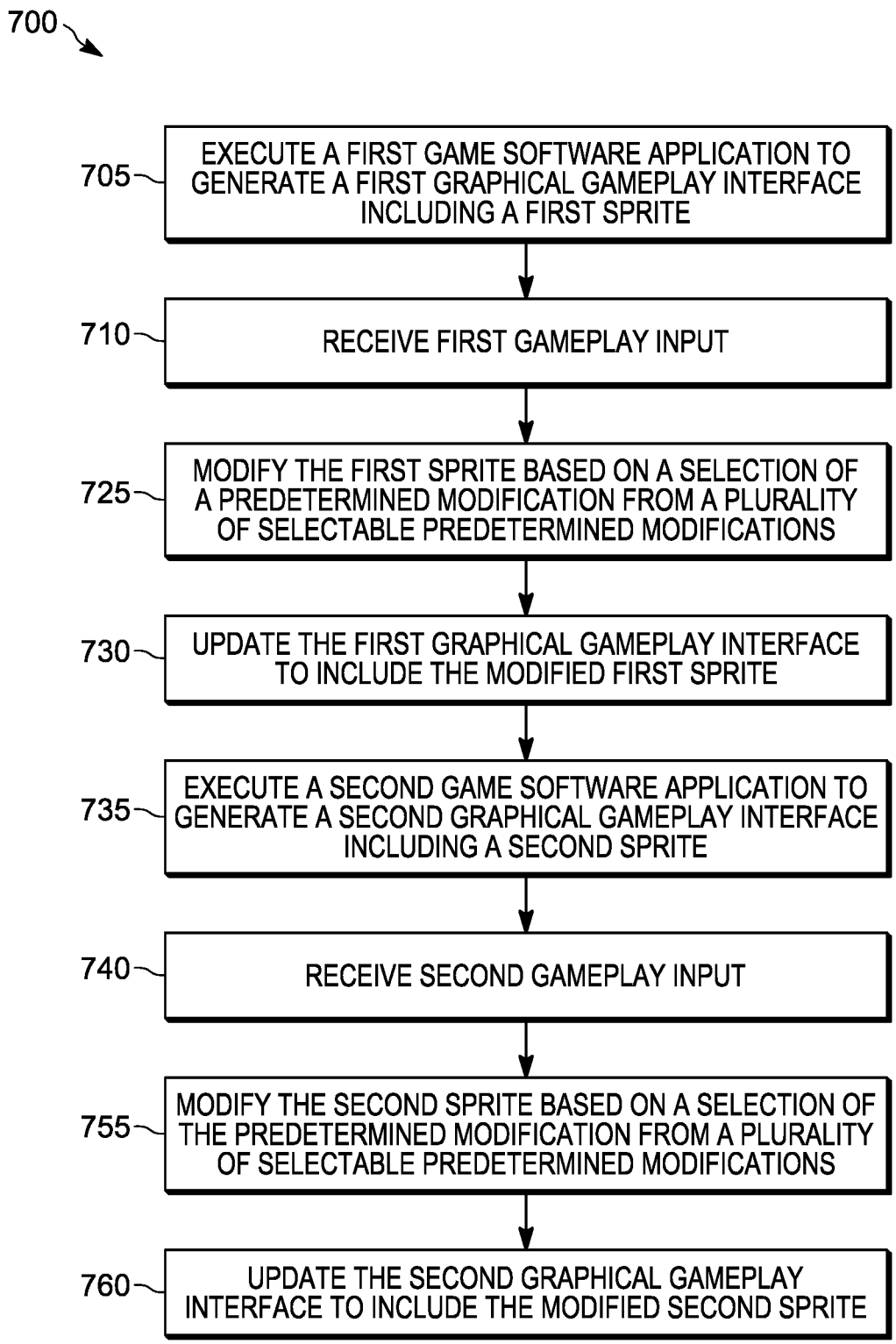
FIG. 7 is a flow chart of an in situ video game editing method.

FIG. 7 is a flow chart of an in situ (i.e., in-game) video game editing method 700. The electronic processor 200 executes the first game software application 235 to generate a first graphical gameplay interface (block 705). The first graphical gameplay interface includes the first sprite 245 illustrated graphically by, for example, the sprite 410 (e.g., the paddle) shown in FIG. 4. The first game software application 235 defines the first sprite 245. The electronic processor 200 receives a first gameplay input from the human interface devices 110 (block 710). In response to receipt of the first gameplay input, the electronic processor 200 moves the first sprite 245 on the first graphical gameplay interface. For example, the electronic processor 200 receives gameplay input when the user presses a button on the controller 125 and, in response to the received gameplay input, (e.g., the user pressing the button on the controller 125) moves the sprite 410 (e.g., the paddle) to a new position on the graphical gameplay interface 400.

Upon receiving input from the user indicating the user's desire to edit the game (such as pressing one of the editing buttons 505 of the controller 125), and a selection of a predetermined modification (a glitch or a filter), the electronic processor 200 modifies the first sprite 245 based on the selected predetermined modification (block 725). Various examples of predetermined modifications are described below in further detail. After the predetermined modification is applied, the electronic processor 200 updates the first graphical gameplay interface to include a modified first sprite 245 (block 730).

In some embodiments, during the course of executing the first game software application, block 725 is repeated several times such that further selected predetermined modifications are applied to various sprites of the first game software application 235 in response to further input provided by the human interface devices 110.

The steps described above may be applied to a plurality of game software applications and a plurality of sprites. For example, in some embodiments, the electronic processor 200 executes the second game software application 240 stored in the memory 205 of the game system 105 to generate a second graphical gameplay interface (block 735). The second graphical gameplay interface includes the second sprite 250. The second game software application 240 defines the second sprite 250. The electronic processor 200 receives a second gameplay input from the human interface devices 110 (block 740). The second gameplay input controls the gameplay on the second graphical gameplay interface. In response to receiving the second gameplay input, the electronic processor 200 moves the second sprite 250 on the second graphical gameplay interface. An example of gameplay input is pressing a button to move the second sprite 250 to jump or turn on the second graphical gameplay interface. Upon receiving input from the user indicating the user's desire to edit the game (such as pressing one of the editing buttons 505 of the controller 125) and a selection of the predetermined modification (which may be the same predetermined modification as the predetermined modification selected for the first game software application), the electronic processor 200 modifies the second sprite 250 based the predetermined modification (block 755) and updates the second graphical gameplay interface to include the modified second sprite 250 (block 760).

The above described method may be applied to any of the sprites included in the first plurality of sprites 242 of the first game software application 235 or any of the sprites included in the second plurality of sprites 247 of the second game software application 240. For example, a third sprite displayed on the first graphical gameplay interface may be modified based on editing input from a user and the first graphical gameplay interface is then updated to include the modified third sprite.

In some embodiments, depending on the modification that was made to, for example, the first sprite 245, the behavior of the modified first sprite 245 will affect other sprites (for example, the third sprite) on the first graphical gameplay interface. For example, if the first sprite 245 is modified in a way that gives the first sprite 245 a virtual shooting ability (i.e., the ability to emit a virtual projectile) and the third sprite touches the virtual projectile (i.e., on the graphical gameplay interface, the projectile "hits" the third sprite) the third attribute of the third sprite may be modified in a manner that is dependent on the type of virtual projectile that the first sprite 245 emitted. Examples of types of virtual projectiles are given below in Table 1. In another example, an attribute of the third sprite is modified when the third sprite touches the modified first sprite 245, and the third sprite displayed on the first graphical gameplay interface is then updated with the modified third attribute. Further, in some embodiments, the selected predetermined modification itself modifies one or more other sprites on the graphical gameplay interface. For example, the predetermined modification may specify how the other sprites are to interact with the first sprite 245 or projectiles emitted from the first sprite 245.

Figure 8:
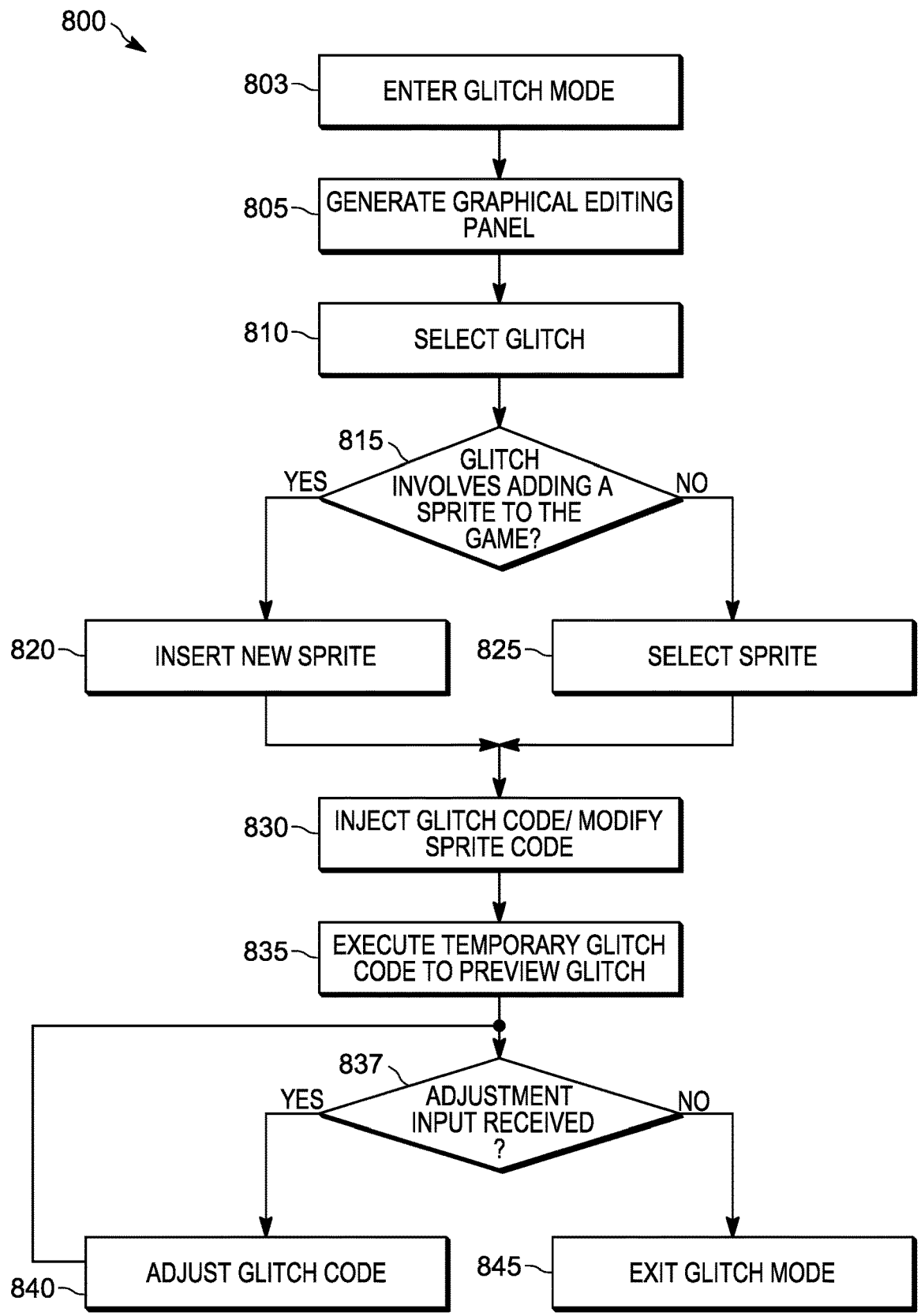
FIG. 8 is a flow chart for adding a glitch to a game

FIG. 8 describes a method 800 for selecting a predetermined modification (a glitch) and modifying a sprite based on the selected glitch. The method 800 may be used, for example, to implement block 725, block 755, or both. Upon receiving editing input or input from the user indicating the user's desire to edit the game (such as pressing one of the editing buttons 505 of the controller 125), the electronic processor 200 creates a graphical editing panel (described in more detail below in FIG. 11) and places the graphical editing panel on a graphical gameplay interface (block 805). Upon receiving a selection of a glitch (block 810), the electronic processor 200 determines whether the glitch involves adding a new sprite to a game software application (for example, the first game software application) (block 815). When the glitch involves adding a new sprite to the game software application, the electronic processor 200 adds the sprite to the game software application. In other words, the electronic processor 200 inserts the code associated with the new sprite defined by the glitch into the code associated with the game software application, and then displays the new sprite within the graphical gameplay interface in accordance with the inserted code (block 820). When the glitch does not involve adding a sprite to a game software application, the electronic processor 200 prompts the user for a sprite selection and receives a selection of a sprite displayed on the graphical gameplay interface (block 825). For example, the electronic processor 200 generates a cursor to prompt the user, and the user manipulates one of the human interface devices 110 to select a sprite (e.g., the sprite 405) on the graphical gameplay interface 400 with the cursor, which causes the selection of the sprite to be received by the electronic processor 200. In some embodiments, the electronic processor 200 adds more than one sprite to the graphical gameplay interface or receives a selection of more than one sprite via a human interface device 110 in blocks 820 and 825, respectively. The electronic processor 200 modifies the code of at least one sprite included in the game software application based on the selected glitch (block 830). In some embodiments, modifying the code of at least one sprite includes adding at least one block of code associated with the selected glitch to at least one sprite included in the game software application. In some embodiments, modifying the code of at least one sprite includes deleting already existing code from at least one sprite included in the game software application based on the selected glitch. In some embodiments, modifying the code of at least one sprite includes changing the existing code of at least one sprite included in the game software application. A change that may be made to the existing code of a sprite is, for example, changing an already existing size parameter value from a first value to a second value (e.g., to alter the size of the sprite on the display). In block 830, the electronic processor 200 may perform any combination of adding code blocks to a sprite, changing the existing code of a sprite, and deleting code from a sprite. During execution of the game software application, a block of code injected at block 830 will one or more of add a physical attribute to a sprite, adjust the physical attribute of a sprite, add a new function or behavior to a sprite, or adjust an existing function or behavior of a sprite. The functions performed by the code blocks are described in more detail below with respect to the example glitches provided in Table 1. The sprite to which the block of code is added depends on the selected glitch and, in some instances, the selected sprite.

Figure 9A:
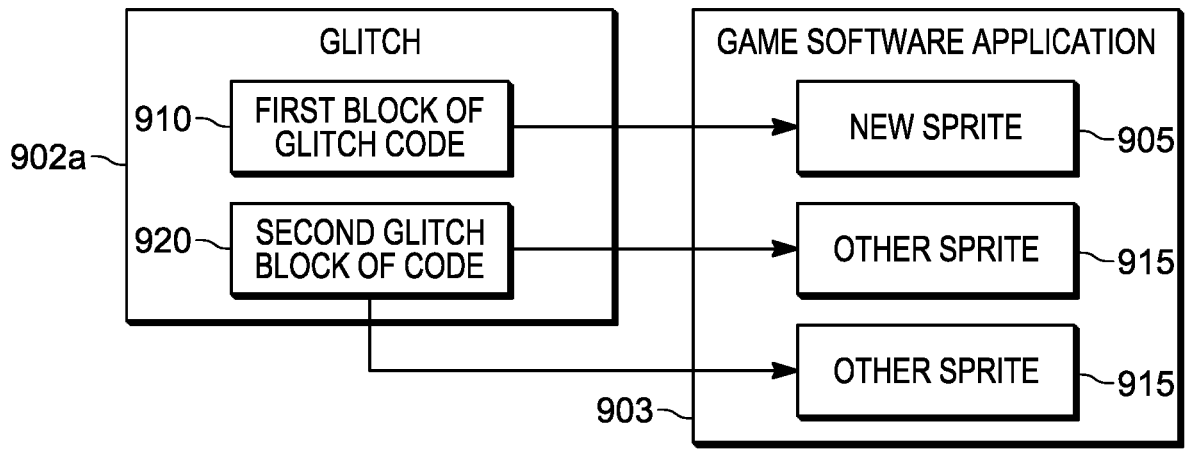
FIG. 9A through FIG. 9D are diagrams illustrating the distribution of code to sprites in a game.

Referring momentarily to FIGS. 9A, 9B, 9C, and 9D, these figures illustrate different ways that blocks of code of a glitch may be distributed amongst the plurality of sprites included in a game software application. In other words, FIGS. 9A, 9B, 9C, and 9D are examples of techniques used to inject code of a glitch 902a, 902b, 902c, and 902d (selected in block 810), into in a game software application 903 (injected in block 830). The game software application 903 may be the first game software application 235, the second game software application 240, or another game software application from the additional game software applications 241 (see FIG. 2). In FIG. 9A, the selected glitch 902a involves adding a new sprite 905 to the game software application 903. The electronic processor 200 adds a first block of glitch code 910 that changes the behavior or appearance of the new sprite 905. The electronic processor 200 adds to one or more sprites 915 included in the game software application 903, other than the new sprite 905, a second block of glitch code 920. The second block of glitch code 920, for example, determines the behavior of the other sprites 915 when the other sprites 915 interact with the new sprite 905.

Figure 9B:
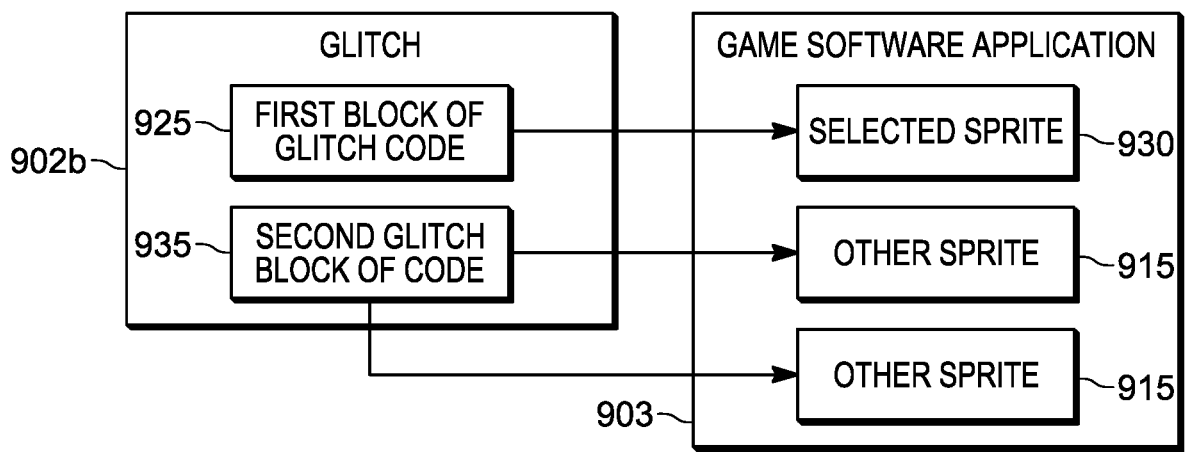

FIG. 9B illustrates the glitch 902b, which does not involve adding a new sprite 905 to the game software application 903. In FIG. 9B, the selected glitch 902b involves the electronic processor 200 receiving a selection of a sprite 930 and adding a first block of glitch code 925 to the selected sprite 930 of a game software application 903. The electronic processor 200 also adds a second block of glitch code 935 to sprites 915, which are one or more sprites of the game software application 903 other than the selected sprite 930. For example, if the selected glitch 902b gives the selected sprite 930 the ability to emit virtual projectiles, then the second block of glitch code 935 defines the manner in which the sprites 915 behave when the sprites 915 interact with a projectile emitted by the selected sprite 930.

Figure 9C:
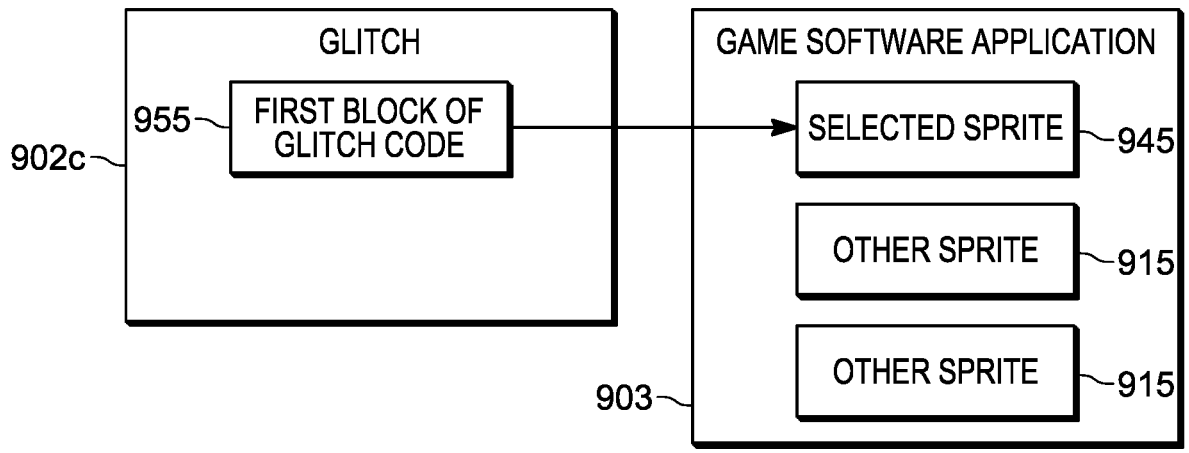

In FIG. 9C the selected type of glitch 902c also involves the electronic processor 200 receiving a selection of a sprite 945 and adds a first block of glitch code 945 to the selected sprite 945. However, in FIG. 9C the electronic processor 200 does not add a block of glitch code to the sprites 915, which are one or more sprites of the game software application 903 other than the selected sprite 945. For example, the first block of glitch code 945 may cause the selected sprite 945 to alternate colors, but the behavior and appearance of the sprites 915 are unchanged by the selected glitch 902c.

Figure 9D:
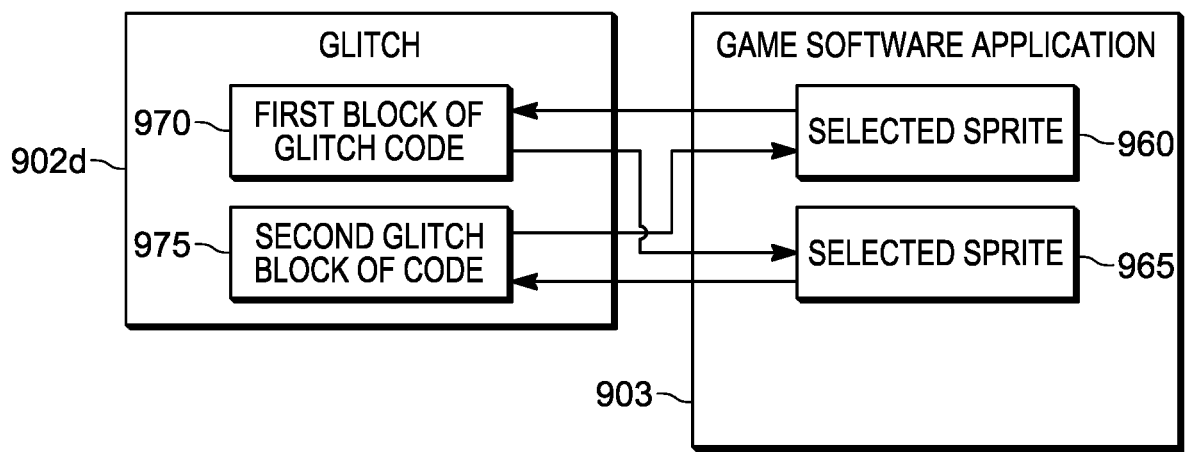

FIG. 9D illustrates the glitch 902d, which involves the electronic processor 200 receiving a selection of a first sprite 960 and a second sprite 965. The glitch 902d further includes retrieving a first block of glitch code 970 from the selected first sprite 960 of a game software application 903, and retrieving a second block of glitch code 975 from the selected second sprite 965 of a game software application 903. The glitch 902d further includes replacing the first block of glitch code 970 in the selected first sprite 960 with the second block of glitch code 975, and replacing the second block of glitch code 975 in the selected second sprite 965 with the first block of glitch code 970. In FIG. 9D, the electronic processor 200 does not add a block of glitch code to sprites (not shown) other than the selected first sprite 960 and second sprite 965. Accordingly, FIG. 9D illustrates a glitch that enables the swapping of sprite code between sprites. Such swapped code may, in effect, swap physical characteristics (e.g., size or color), swap appearances entirely, swap behavioral characteristics (e.g., mobility), or swap behaviors entirely between sprites. In some embodiments, the glitch 902d involves copying code from one sprite to another sprite, without swapping. For example, the glitch 902d may involve the retrieval of first block of glitch code 970 from the first sprite 960 to replace the second block of glitch code 970 of the second sprite 965, or to add to the glitch code of the second sprite 965.

By injecting a block of glitch code into a sprite, as described with respect to FIGS. 9A, 9B, 9C, and 9D, the electronic processor 200, for example, adds the glitch code to a memory including code defining the to-be-modified sprite(s) (e.g., the memory 205), and associates the added glitch code with the relevant sprite(s) within the memory. It should be understood that the sprites 905, 930, 945, 960, and 965 in FIGS. 9A, 9B, 9C, and 9D, while illustrated as single sprites, may be any number of sprites, and that the first block of code and the second block of code, while illustrated as single blocks of code, may be any number of blocks of code used to implement a selected glitch. It should also be understood that the game software application may include any number of sprites and that the two other sprites 915 shown in FIGS. 9A, 9B, and 9C are merely illustrative.

Returning now to FIG. 8, the electronic processor 200 executes a block of temporary glitch code to preview the glitch (block 835). For example, regardless of the selected glitch, the electronic processor 200 injects and executes a block of temporary glitch code to the game software application. When the block of temporary glitch code is executed, the electronic processor 200 generates a preview on the display 115 of the selected glitch by executing the modification to the sprite code illustrated by block 830. Further, when the block of temporary glitch code is executed, the electronic processor 200 determines whether an adjustment to the glitch code is received from a user via the human interface devices 110 (block 837). In response to receipt of an adjustment selection from the human interface devices 110, the electronic processor 200 adjusts the modification made to the sprite code (in block 830) of the one or more sprites (block 840). For example, if the selected glitch changes the size of a selected sprite, the user may be able to select, from a plurality of size options displayed on the display 115, a desired size of the sprite. When the electronic processor 200 receives a user selection of a desired size, the electronic processor 200 adjusts the size of the selected sprite to reflect the selected desired size. Returning to block 837, when no further adjustment input is received (or an exit command is received), the electronic processor 200 ceases execution of the temporary glitch code, stops displaying the graphical editing panel, and exits the glitch mode (block 845). In some embodiments, blocks 835, 837, and 840 are bypassed and the glitch mode is exited after sprite code is modified in block 830.

Figure 10:
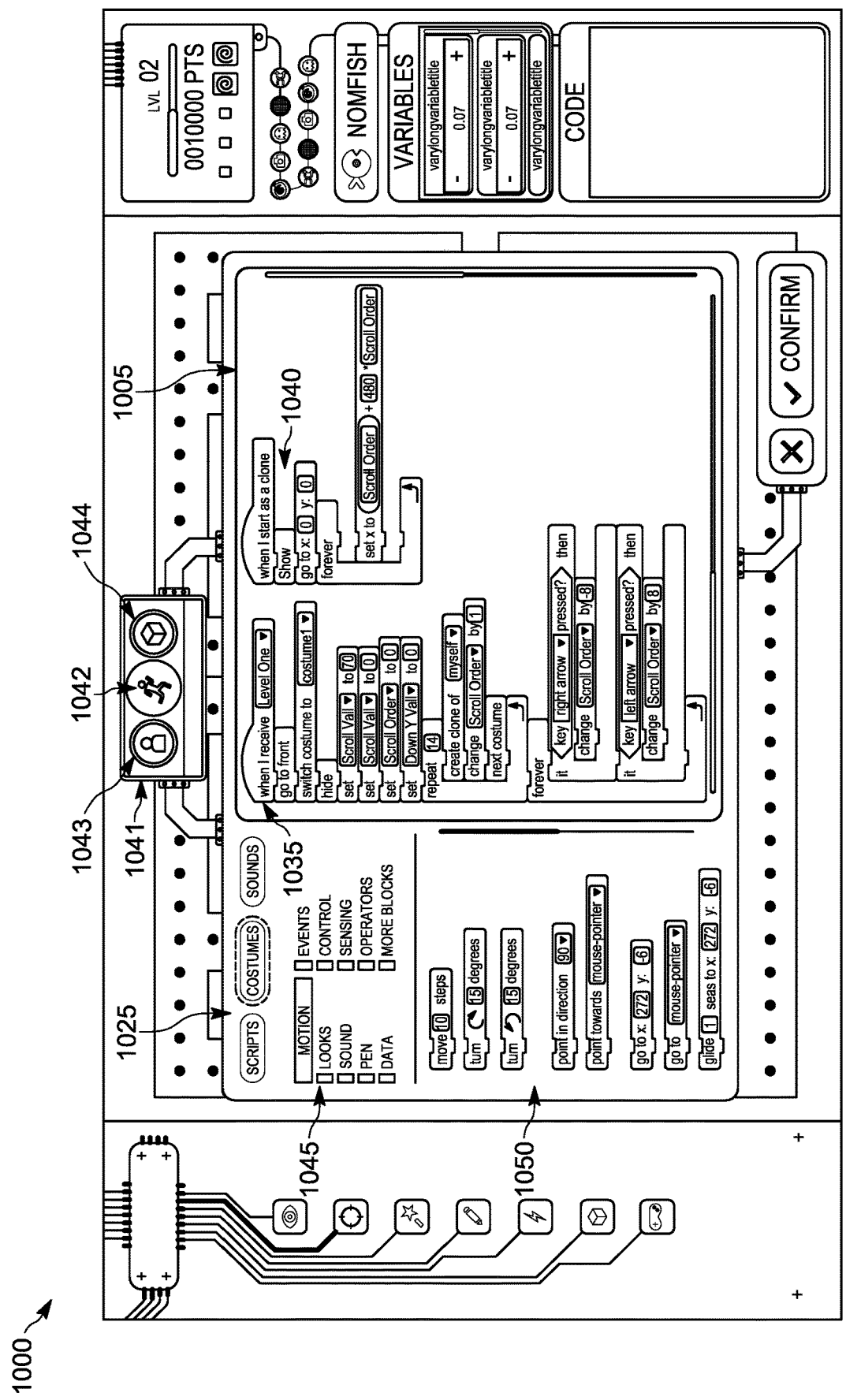
FIG. 10 is a block diagram of a graphical editing interface that allows a user to edit the code of a game software application.

FIG. 10 illustrates a code editing interface 1000 that allows the user to edit glitches and filters in the glitch-filter library 225. The code editing interface 1000 may be generated and displayed on the display 115 by the game system 105 when the electronic processor 200 executes editing software stored on the memory 205. The code editing interface 1000 may be displayed in response to the game system 105 receiving user input via the human interface devices 110 requesting that the game system 105 enter into a code editing mode (see block 630 of FIG. 6).

The code editing interface 1000 displays the software code of one or more glitches and filters of a game software application in the code panel 1005. For example, the code panel 1005 may display glitch code and filter code of the first game software application 235. In some embodiments, (such as the embodiment illustrated in FIG. 10) the code panel 1005 illustrates one or more code blocks associated with a single glitch or filter.

The code editing interface 1000 also includes an editing panel 1025 including editing function icons, which may be graphical, textual, or both. The editing function icons are each associated with an editing function, such as choosing a glitch to edit and selecting blocks of code to add to the code of a glitch or filter. For example, in response to selection of a first editing function icon, a list of selectable glitches may be displayed. In response to a user selection of a glitch, the glitch code associated with the selected glitch is displayed in the code panel 1005. The glitch code of each glitch is made up of a plurality of blocks of code that define a portion of the physical attributes and the behaviors of a sprite that a glitch is applied to. For example, the glitch code is displayed in the code panel 1005 and includes blocks of code 1035, 1040 that define a portion of the physical attributes and behaviors of a sprite that the glitch is applied to. The code editing interface 1000 is configured to receive modifications to the code blocks 1035, 1040 based on user input via the human interface devices 110. The user may directly modify the code, for example, by typing to delete, add, or replace code, using other graphical inputs (e.g., using graphical arrows or scroll bars), or dragging and dropping graphical code segments that may be combined to form code blocks to and from the editing panel 1025 and the glitch code in the code panel 1005. A menu 1041 (located above the code panel 1005 in the illustrated embodiment) highlights an icon which signifies to the user which sprite the code will be added to when the glitch is applied to the game software application. For example, when an icon 1042 is highlighted, or in some way distinguished, the code displayed in the code panel 1005 is code that will be added to a selected sprite (the protagonist) upon applying the glitch. When the icon 1043 is highlighted, or in some way distinguished, the code displayed in the code panel 1005 is code that will be added to sprites included in a game software application other than a selected sprite upon applying the glitch. When the icon 1044 is highlighted, or in some way distinguished, the code displayed in the code panel 1005 is code that will be added to a new sprite that is added upon applying the glitch.

In the embodiment illustrated in FIG. 10, the editing panel 1025 contains a plurality of categories 1045 of graphical code segments 1050. The graphical code segments 1050 are placed in the categories 1045 based on what the graphical code segments define in a sprite. For example, graphical code segments 1050 included in a looks category determine the appearance of a sprite on a graphical gameplay interface, graphical code segments included in a controls category determine how a sprite reacts to input from a human interface device 110, and graphical code segments included in a motion category determine how a sprite moves on a graphical gameplay interface. When a user selects a category of graphical code segments, each of the graphical code segments included in the category are displayed in the editing panel 1025. In the example illustrated, the motion category is selected and, in response, the electronic processor 200 displays graphical code segments that define, for example, how much a sprite moves and in what direction.

In some embodiments, some of the functionality of the system 100 described herein employs the Scratch™ programming language developed at the Massachusetts Institute of Technology ("MIT") and some of the functionality of the system 100 described herein employs JavaScript™. In some embodiments, other programming languages are used.

Figure 11:
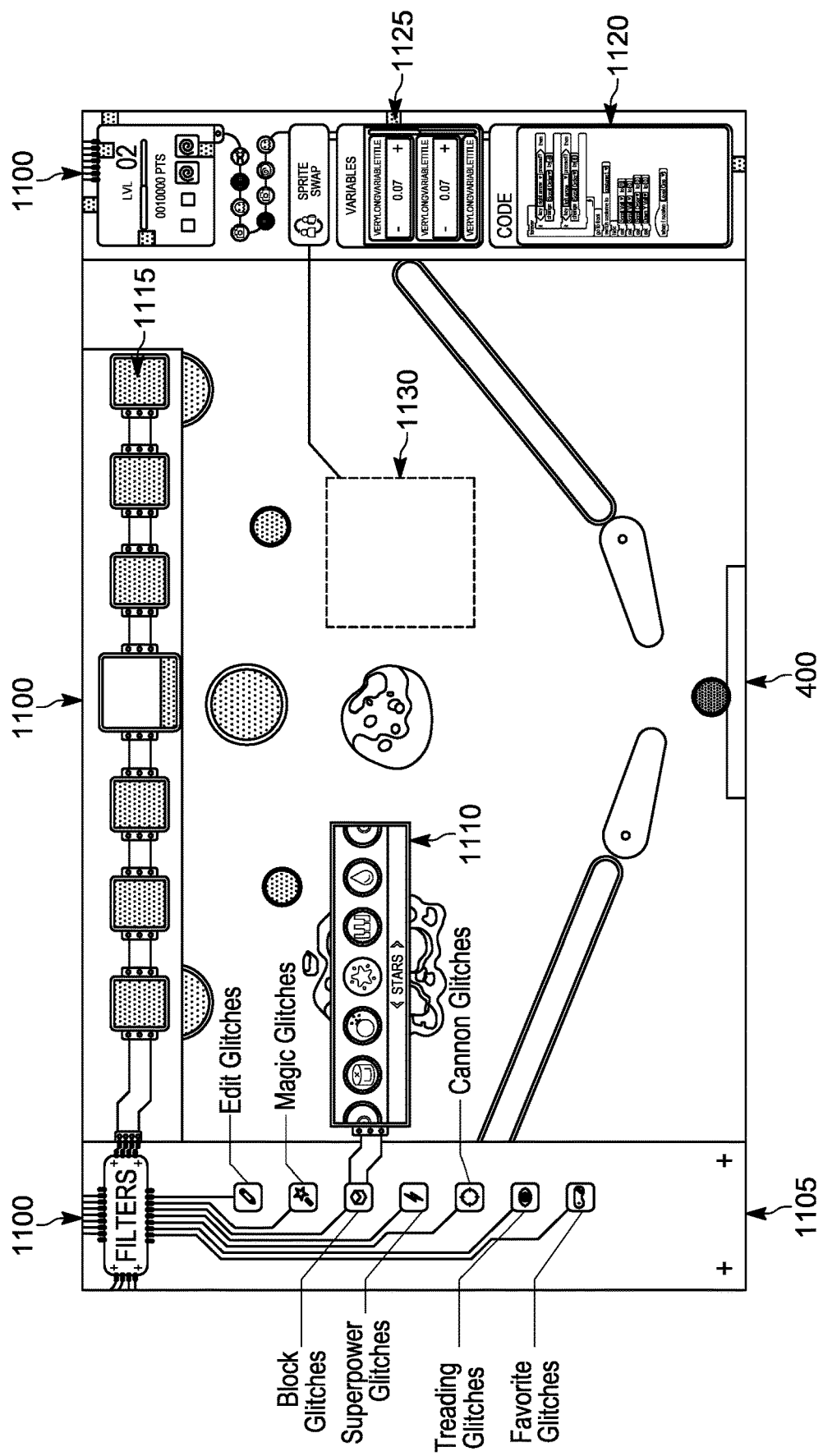
FIG. 11 is an illustration of a graphical editing panel overlaying a graphical gameplay interface.

FIG. 11 illustrates the graphical gameplay interface 400 overlaid with a graphical editing panel 1100 while simultaneously displaying the sprite 405. As described above, the graphical editing panel 1100 may be displayed by the electronic processor 200 on the display 115 when the electronic processor 200 receives editing input from the user and enters a glitch mode. The graphical editing panel 1100 includes a plurality of selectable predetermined modifications. On the left side of the graphical editing panel 1100 is a glitch menu 1105 displaying icons (or virtual buttons) for one or more types of glitches. The glitch types displayed in the glitch menu 1105 include edit glitches, magic glitches, block glitches, superpower glitches, cannon glitches, favorite glitches, and trending glitches. Edit glitches modify a physical attribute or a behavior of a sprite, such as the size of the sprite or the color of the sprite. Edit glitches are generally one-time changes that are static. In contract, magic glitches cause a physical attribute or behavior of a sprite to change continuously. For example, the size of the sprite may repeatedly increase and decrease. Block glitches cause a new sprite to be added to a game software application. Super power glitches modify a physical attribute or behavior of a sprite in response to input from a human interface device 110. In one example, a super power glitch results in two sprites, selected via a human interface device 110, to swap positions in response to a button press on the game controller 125. Cannon glitches involve modifying a sprite's behavior to give the sprite an ability to shoot virtual projectiles. Trending glitches are a list of glitches that are most often applied to game software applications, or the particular game software application currently being executed, during a most recent predetermined period of time. In some embodiments, favorite glitches may be glitches that are most often applied to game software applications by the electronic processor 200 based on selections received from a human interface device 110. In other embodiments, favorite glitches may also be glitches that the electronic processor 200 receives a selection of via a human interface device 110 indicting that the glitch is a favorite. When the electronic processor 200 receives a selection of an icon representing a type of glitch, a menu 1110 of glitch icons is displayed as an extension of the graphical editing panel 1100. Each glitch icon in the menu 1110 represents a glitch that is associated with the selected type of glitch. Each glitch icon in the displayed menu of glitch icons is available for user selection via the human interface devices 110.

When the electronic processor 200 receives a selection of a glitch icon, the glitch associated with the glitch icon is applied by the electronic processor 200 to one or more sprites on the graphical gameplay interface 400. Applying a glitch to one or more sprites includes modifying the code of the one or more sprites. In one example, upon receiving a selection of a glitch icon on the glitch menu 1105 and the sprite 405, the electronic processor 200 retrieves one or more blocks of code associated with the selected glitch and modifies the sprite 405 by adding the block of code to the sprite (see, e.g., blocks 815, 825, and 830 of FIG. 8). In another example, upon receiving a selection of a glitch icon on the glitch menu 1105, the electronic processor 200 adds a new sprite to the graphical gameplay interface 400 by adding a plurality of code blocks defining the sprite to the first game software application 235 (see, e.g., blocks 815, 820, and 830 of FIG. 8).

The electronic processor 200 of the game system 105 is also configured to apply a glitch to sprites in a graphical gameplay interface that are not selected by a user or newly added to a graphical gameplay interface. For example, in the graphical gameplay interface 400, the glitch may be applied to other sprites including a base and bumpers. As described above in FIG. 9, the blocks of code that are added and the sprites that receive the blocks of code depend on the selection of the glitch that the electronic processor 200 receives. In some embodiments, glitches may modify the behavior of a sprite previously added to the graphical gameplay interface 400 by the electronic processor 200 in response to receiving a selection of a previous glitch.

When the electronic processor 200 is executing the associated game software application having the glitch, sprites in a graphical gameplay interface are displayed and controlled according to the applied glitch. For example, glitches can provide the sprite 405 with the a virtual flying ability, provide the sprite 405 a virtual gravitational pull, prevent the virtual movement of the previously mobile sprite 405, enable the virtual movement of the previously immobile sprite 405, provide the sprite 405 with a virtual shooting ability, provide a virtual attractive force between the sprite 405 and a virtual graphical object displayed by the graphical gameplay interface 400, and change the visual representation of the sprite 405. See Table 1 for a list of example glitches and further description.

In the illustrated embodiment, a menu 1115 displays the filters that are available for user selection via the human interface devices 110. A filter is similar to a glitch in that it also, when executed by the game system 105, modifies one or more attributes or code blocks of a sprite included in a game software application (for example, the first game software application 235) of the games library 230. However, a filter modifies the code of a plurality of sprites, or all sprites, in the game software application, adds a plurality of new sprites to the game software application each having the same block of code, or both. Accordingly, while a glitch is generally a sprite-centric modification, a filter is a game-wide modification. In some embodiments, a list of sprites is displayed before application of the filter to enable user selection of one or more particular sprites of the game software application that should not be modified when the filter is applied.

In some embodiments, rather than providing a glitch menu that is spatially or temporally separated from a filter menu, a combined glitch-filter menu with both selectable glitch icons and selectable filter icons is provided on the graphical gameplay interface 400.

In response to selection of a glitch or filter (see, e.g., block 810 of FIG. 8), the code 1120 associated with the selected glitch or filter is displayed in the lower right hand corner of the graphical editing panel 1100. In some embodiments, when the electronic processor 200 receives a selection of a sprite to receive the selected glitch, a visual representation of the code 1120 being inserted into the sprite is displayed on the graphical gameplay interface 400 (see, e.g., FIG. 13C). For example, and with reference to the modification of code in block 830 of FIG. 8, a graphic 1307 is displayed moving along a path from the code 1120 to the sprite receiving the glitch as shown, for example, in FIG. 13C.

Figure 12A:
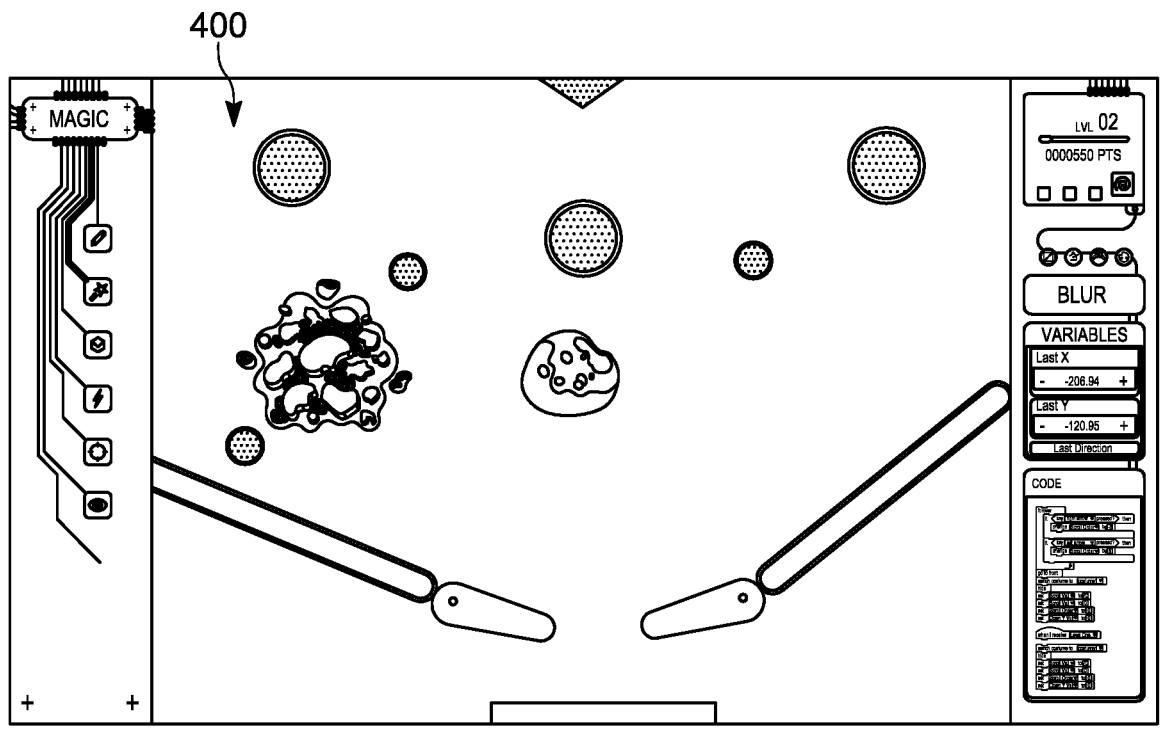
FIG. 12A and FIG. 12 B illustrate an example of a parameter included in a parameter glitch menu of the graphical editing panel of FIG. 11 being adjusted.
Figure 12B:
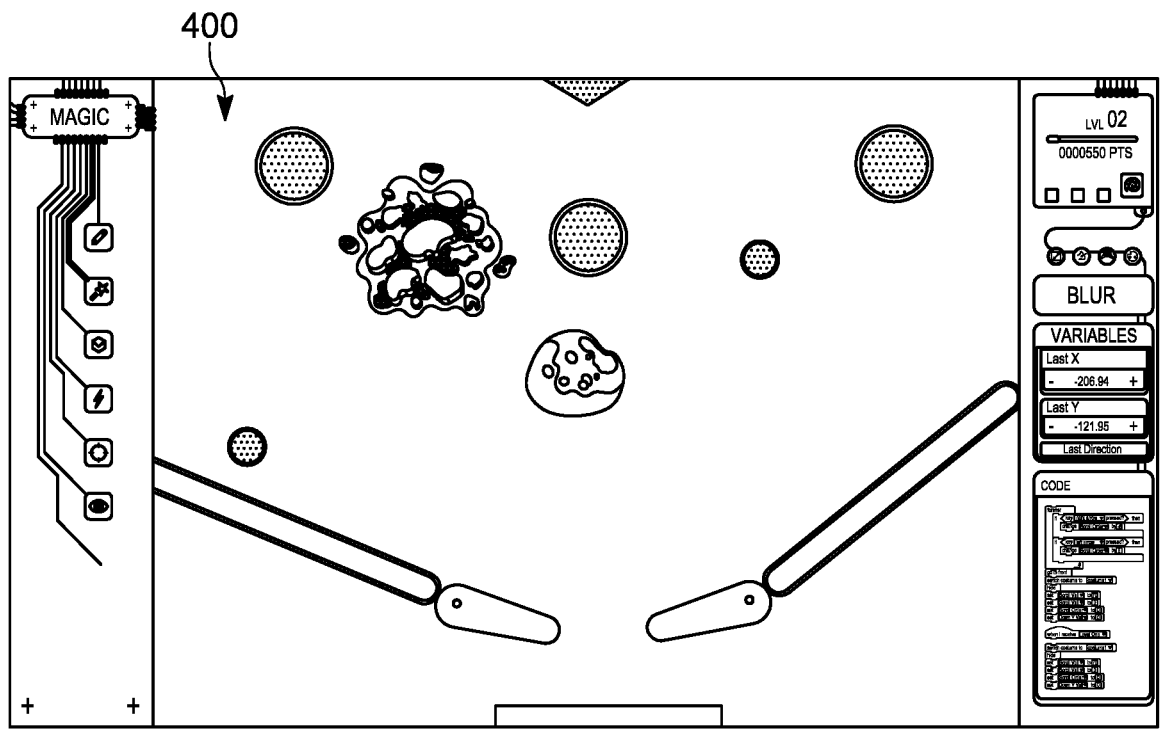

On the right side of the graphical editing panel 1100 is a parameter glitch menu 1125. The parameter glitch menu 1125 lists a plurality of physical attributes of a sprite that may be adjusted according to user input for a selected glitch. With reference to the flow chart of FIG. 8, in response to receiving a selection of a glitch referred to as "scale" (block 810), and selection of a first sprite (block 825), the electronic processor 200 may further receive an adjustment input at the parameter glitch menu 1125 (block 840). The adjustment input may include an adjustment of the x-position parameter of the selected sprite, in which case the electronic processor 200 adjusts the x-position of the sprite so that the position of the sprite on the graphical gameplay interface 400 matches the adjustment input received by the electronic processor 200. An example of adjusting a parameter included in the parameter glitch menu 1125 is shown in FIG. 12A and FIG. 12B. FIG. 12A illustrates the graphical gameplay interface 400 overlaid with the graphical editing panel 1100 before the electronic processor 200 receives adjustment input for the parameter representing the x-position of the sprite, and FIG. 12B illustrates the graphical gameplay interface 400 overlaid with the graphical editing panel 1100 after the electronic processor 200 receives adjustment input for the parameter representing the x-position of the first sprite.

A sprite is selected to receive a glitch in a variety ways. For example, a cursor 1130 may be provided on the graphical gameplay interface 400 in the glitch mode (see, e.g., block 825 of FIG. 8), and the cursor 1130 may be controlled by the user via the human interface devices 110 to provide a selection of the sprite 405. The cursor 1130, which may be a variety of shapes and sizes, is a virtual graphical object overlaid on the graphical gameplay interface 400. For example, in some embodiments, the cursor 1130 is a small pointer that allows the user to select a single sprite to receive a glitch, or a large square (or other shape) that allows the user to select multiple sprites to receive the glitch. In some embodiments, the user may be able to adjust the size of the cursor 1130 to cover a majority of the graphical representation of the sprite that the user has decided to select.

Table 1 (below) describes examples of the ways that glitches modify sprites in a game software application.

TABLE 1

| | Example Glitches | | |
|---|---|---|---|
| Glitch Name | Type of Modification by Code Block | Illustrative Figure for Code Block Addition | Glitch Description |
| Unicorn | Add new functionality to a selected sprite | FIG. 9C | A code block is added to a selected sprite. The code block is a forever loop that continuously adjusts a color parameter of a sprite during gameplay to cycle through colors. |

TABLE 1-continued

Example Glitches

| Glitch Name | Type of Modification by Code Block | Illustrative Figure for Code Block Addition | Glitch Description |
|---|---|---|---|
| Zombify | Modify functionality of a selected sprite | FIG. 9C | A code block is added to a selected sprite. The code block overrides the effect of the selected sprite's speed and direction of movement code so that a sprite moves in a random direction without (or regardless of) receiving instruction from the user. |
| Build a Boulder | Add physical attributes to a new sprite. Modify functionality of other sprites. | FIG., 9A | A new sprite is added to the graphical gameplay interface. A code block defining the new sprite as a boulder sprite is added to the new sprite. A code block is added to every sprite in the game software application other than the boulder sprite. The code block causes the sprite to return to their previous position on the graphical gameplay interface when they overlap the boulder sprite on the graphical gameplay interface. It appears to the user that sprites cannot move through the boulder sprite on the graphical gameplay interface. |
| Warp Portal | Add physical attributes to a new sprites. Modify functionality of other sprites. | FIG. 9A | Two new sprites are added to the graphical gameplay interface. A code block is added to both new sprites to define the sprites as warp sprites. A code block is added to every sprite in the game software application other than the warp sprite. The code block added to the other sprites causes the sprites to move to the position of a warp sprite on the graphical gameplay interface if the sprite touches the other warp sprite regardless of the movement code defined in the sprite that touched a warp sprite. |
| Freeze Gun | Add new functionality to the selected sprite. Modify functionality of other sprites. | FIG. 9B | A code block is added to a selected sprite giving the sprite a virtual shooting ability (i.e., the ability to emit virtual projectiles). A code block is added to each sprite in the game software application other than the sprite with the virtual shooting ability. The code block causes sprites to become immobile, overriding the movement code included in the sprite, when they touch a virtual projectile emitted by the first sprite. |
| Clone Gun | Add new functionality to the selected sprite and the other sprites. | FIG. 9B | A code block is added to a selected sprite giving the sprite a virtual shooting ability. A code block is added to each sprite in the game software application other than the sprite with the virtual shooting ability. The code block added to each of the other sprites causes the electronic processor 200 to clone a sprite when the sprite is touched by a virtual projectiles. To clone, the electronic processor 200 creates a new clone sprite with duplicate code of the parent sprite being cloned. A code block is also added to each sprite in the game software application, other than the sprite with the virtual shooting ability, that defines further sprite behavior when the sprite is a clone. For example, when a sprite is cloned, the added code block copied from the parent sprite causes the clone to move away from the parent sprite. This way the clone sprite is visible to the user on the graphical gameplay interface. |

TABLE 1-continued

Example Glitches

| Glitch Name | Type of Modification by Code Block | Illustrative Figure for Code Block Addition | Glitch Description |
|---|---|---|---|
| Musicalize | Add new functionality to the selected sprite. | FIG. 9C | A code block is added to a selected sprite. The code block causes the speaker 132 to emit a sound when the selected sprite touches another sprite on the graphical gameplay interface. |
| Shrink | Modify the attribute of the selected sprite. | FIG. 9C | A code block is added to a selected sprite. The code block sets the selected sprite's size attribute to half of the sprite's original size. |
| Grow | Modify the attribute of the selected sprite. | FIG. 9C | A code block is added to a selected sprite. The code block sets the selected sprite's size attribute to double the sprite's original size |
| Dizzy | Add new functionality to the selected sprite. | FIG. 9C | A code block is added to a selected sprite. The code block includes a forever loop in which the sprite periodically turns a set number of degrees. |
| Ghost | Add a new physical attribute to the selected sprite. | FIG. 9C | A code block that gives a selected sprite a transparent appearance is added to the selected sprite. Code blocks that allow a user to adjust the transparency of the sprite (e.g., via the parameter glitch menu 1125) are also added to the sprite. |
| Lava | Add physical attributes to a new sprite. Modify functionality of other sprites. | FIG. 9A | A new sprite is added to the graphical gameplay interface. A code block defining the new sprite as a lava sprite is added to the new sprite. Each sprite other than the lava sprite receives a code block that cause the sprites to disappear when they touch the lava sprite by commanding the electronic processor 200 to cease execution of all code associated with the sprite that touched the lava sprite. |
| Bomb | Add physical attributes to a new sprite. Modify functionality of other sprites. | FIG. 9A | A new sprite is added to the graphical gameplay interface. A code block defining the new sprite as a bomb sprite is added to the new sprite. Each sprite other than the bomb sprite receives a code block that cause the sprites to disappear when they touch the bomb sprite by commanding the electronic processor 200 to cease execution of all code associated with the sprite that touched the bomb sprite. |
| Rotate | Add new functionality to the selected sprite. | FIG. 9C | A code block is added to a selected sprite. The code block causes the selected sprite to rotate on the graphical gameplay interface to face a direction indicated by a cursor. |
| Pixelate | Add a new physical attribute to the selected sprite. | FIG. C | A code block that gives a selected sprite a pixelated appearance is added to the selected sprite. Code blocks that allow a user to adjust the pixilation of the sprite (e.g., via the parameter glitch menu 1125) are also added to the sprite. |
| Mosaic | Add a new physical attribute to the selected sprite. | FIG. 9C | A code block that gives a selected sprite the appearance of a mosaic is added to the selected sprite. Code blocks that allow a user to adjust the intensity of the mosaic effect of the sprite (e.g., via the parameter glitch menu 1125) are also added to the sprite. |
| Fisheye | Add a new physical attribute to the selected sprite. | FIG. 9C | A code block that gives a selected sprite the appearance that the selected sprite is being viewed through a fisheye lens is added to the selected sprite. Code blocks that allow a user to adjust the intensity of the fisheye effect of the sprite are also added to the sprite. |
| Brightness | Add a new function to the selected sprite. | FIG. 9C | A code block is added to a selected sprite. The code block is a forever loop that causes the sprite to repeatedly grow |

TABLE 1-continued

Example Glitches

| Glitch Name | Type of Modification by Code Block | Illustrative Figure for Code Block Addition | Glitch Description |
|---|---|---|---|
| | | | lighter and then darker by continuously changing a brightness attribute of the sprite. Code blocks that allow a user to adjust the intensity of the brightness change of the sprite (e.g., via the parameter glitch menu 1125) are also added to the sprite. |
| Magnetism | Modify the functionality of two selected sprites. | FIG. 9B | A code block is added to each of two selected sprites. The code blocks cause the two selected sprites to move towards each other as if they were magnetically attracted to one another. |
| Video Costume | Modify the physical appearance of the selected sprite. | FIG. 9C | A code block is added to a selected sprite. The code block includes image data obtained via the camera 130 or another source, and cropped to the shape of the selected sprite. |
| Sprite Appearance Swap | Modify the physical attributes of two selected sprites. | FIG. 9D | A first and second sprite's appearance attributes are modified in a manner that causes a graphic that represents a first sprite on the graphical gameplay interface to change to a graphic that represents a second sprite on the graphical gameplay interface and the graphic that represents the second sprite on the graphical gameplay interface to change to the graphic that represents the first sprite on the graphical gameplay interface. |
| Sprite Behavior Swap | Modify the behavioral attributes of two selected sprites. | FIG. 9D | A first and second sprite's behavioral attributes are modified in a manner that causes the behavior of a first sprite on the graphical gameplay interface to change to the behavior of a second sprite on the graphical gameplay interface, and the behavior of the second sprite on the graphical gameplay interface to change to the behavior of the first sprite on the graphical gameplay interface. |

Figure 13A:
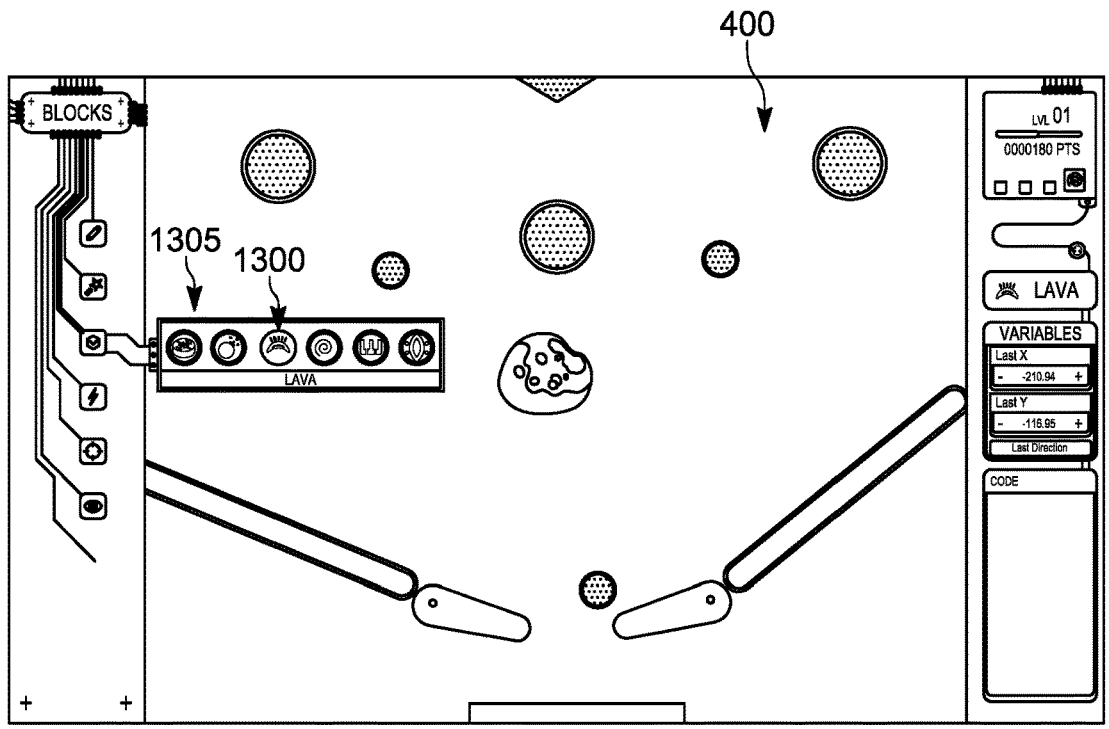
FIG. 13A through FIG. 13D illustrate an example application of a glitch that includes adding a new sprite to a game software application and other sprites included in the game software application.
Figure 13B:
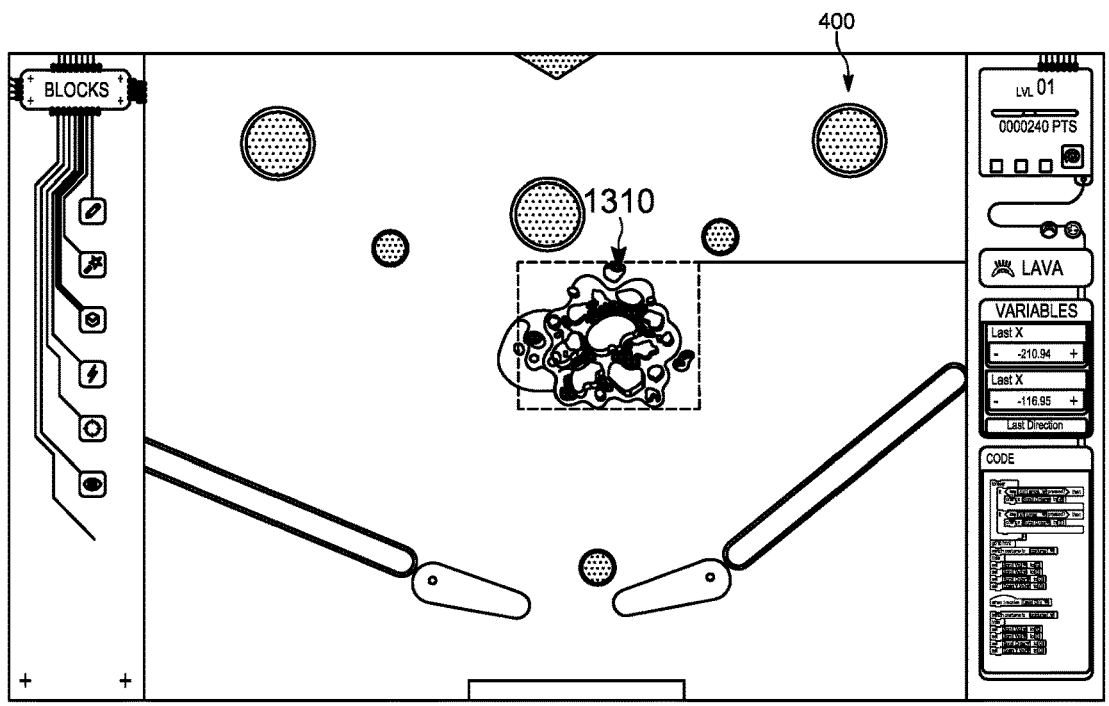
Figure 13C:
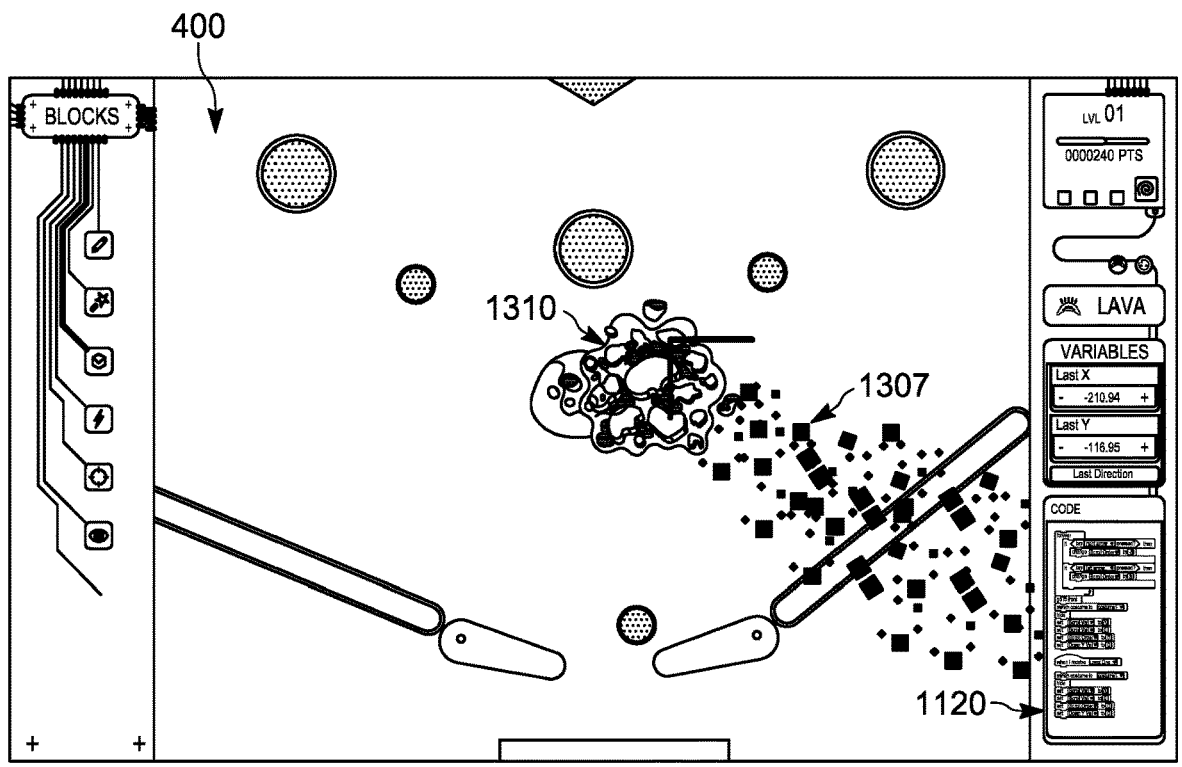
Figure 13D:
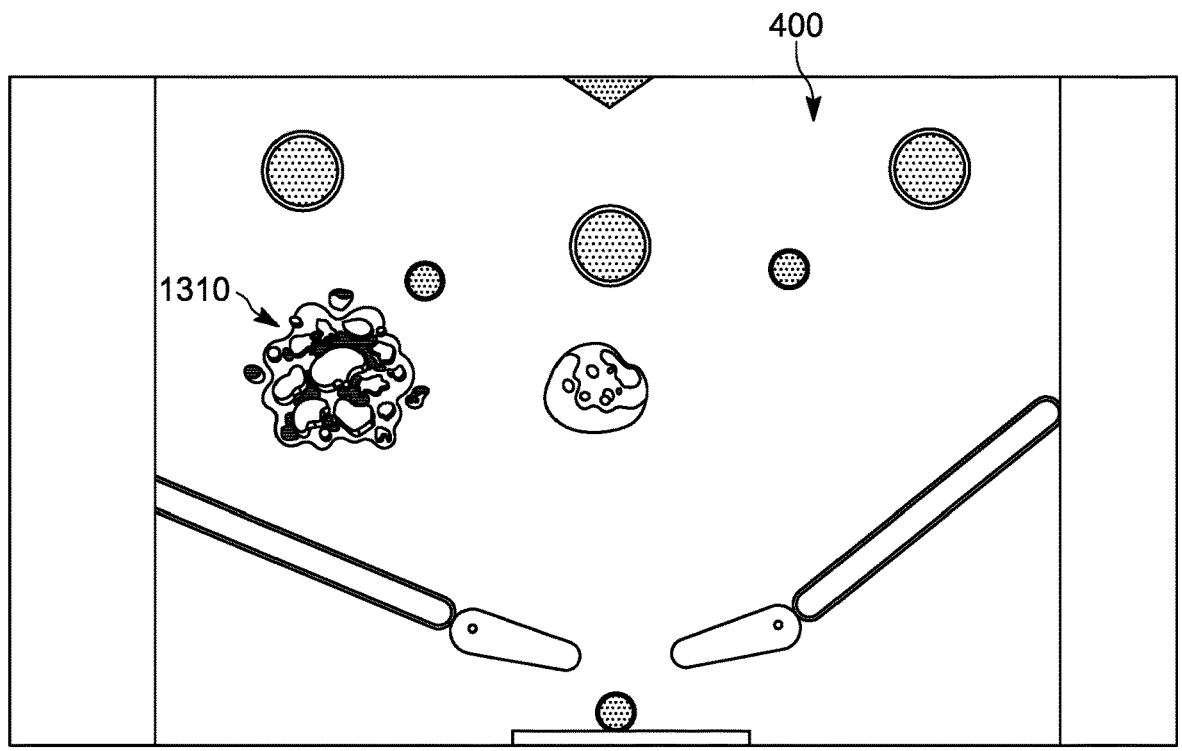

FIGS. 13A through 19C illustrate the application of glitches or filters to sprites of the graphical gameplay interface 400. The glitches and filters may be added via one or both of the flowcharts 700 and 800. More specifically, FIGS. 13A through 13D illustrate applying a glitch that involves adding a new sprite to the graphical gameplay interface 400 via addition to the first game software application 235. In FIG. 13A the electronic processor 200 receives a selection of a glitch 1300 called lava from the menu 1305 of block type glitches. FIG. 13B illustrates the electronic processor 200 adding a new sprite (a lava sprite) 1310 associated with the lava glitch 1300 to the graphical gameplay interface 400. FIG. 13C illustrates the electronic processor 200 applying glitch code associated with the glitch to the new sprite 1310 by having the graphic 1307 move along a path from the code 1120 of the glitch to the sprite 1310. This visualization of a code block addition assists a user in recognizing the application of the glitch. FIG. 13D illustrates the graphical gameplay interface 400 updated to include the lava glitch 1300 once the glitch mode is exited.

Figure 14A:
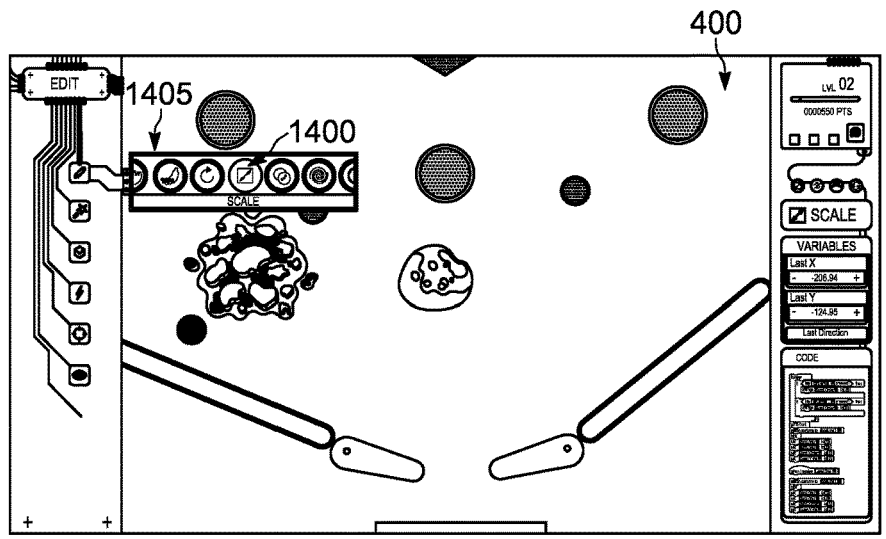
FIG. 14A through FIG. 14E illustrate an example application of a glitch that modifies a selected sprite within a game software application.
Figure 14B:
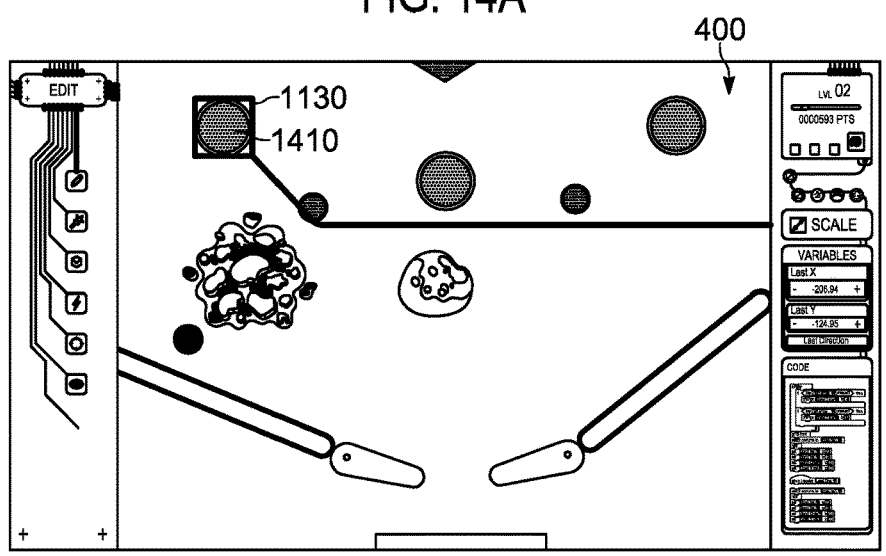
Figure 14C:
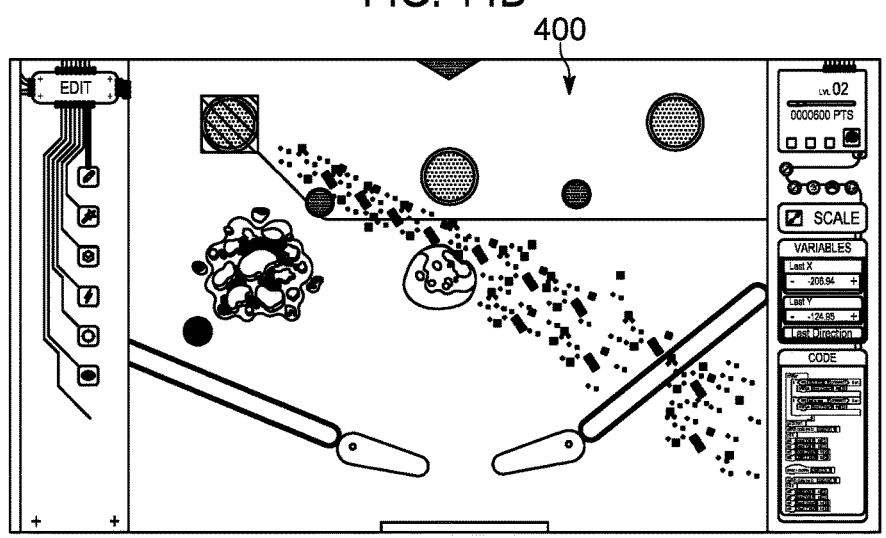
Figure 14D:
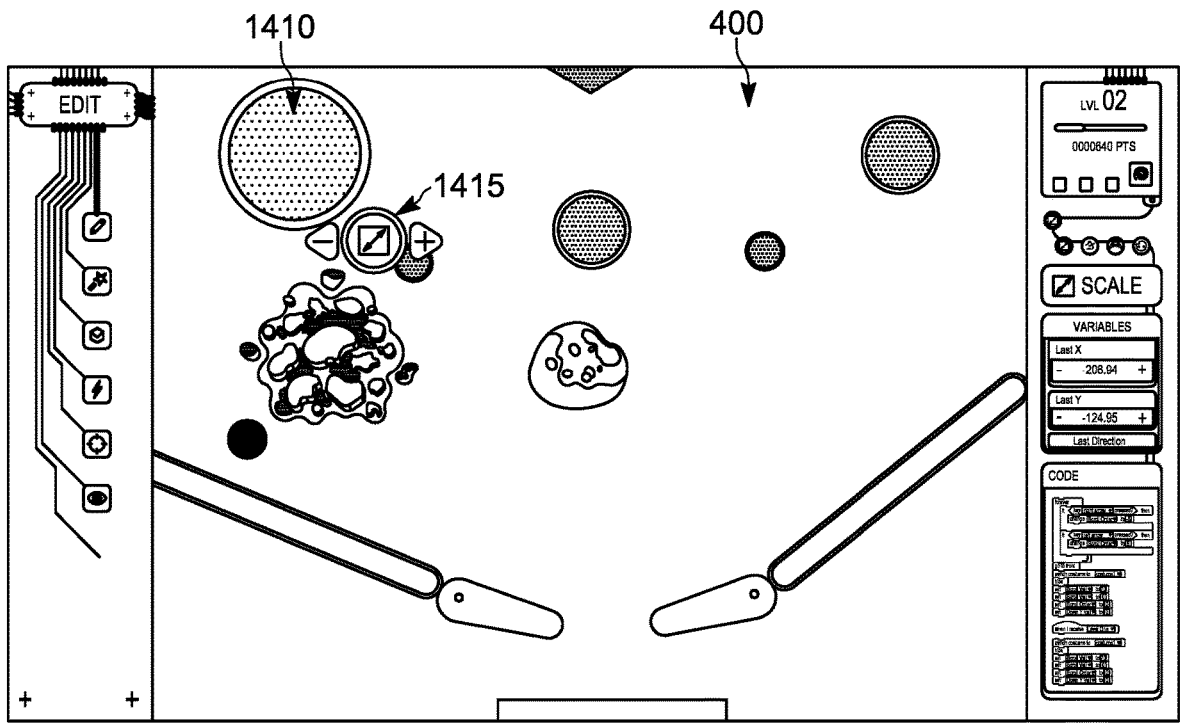
Figure 14E:
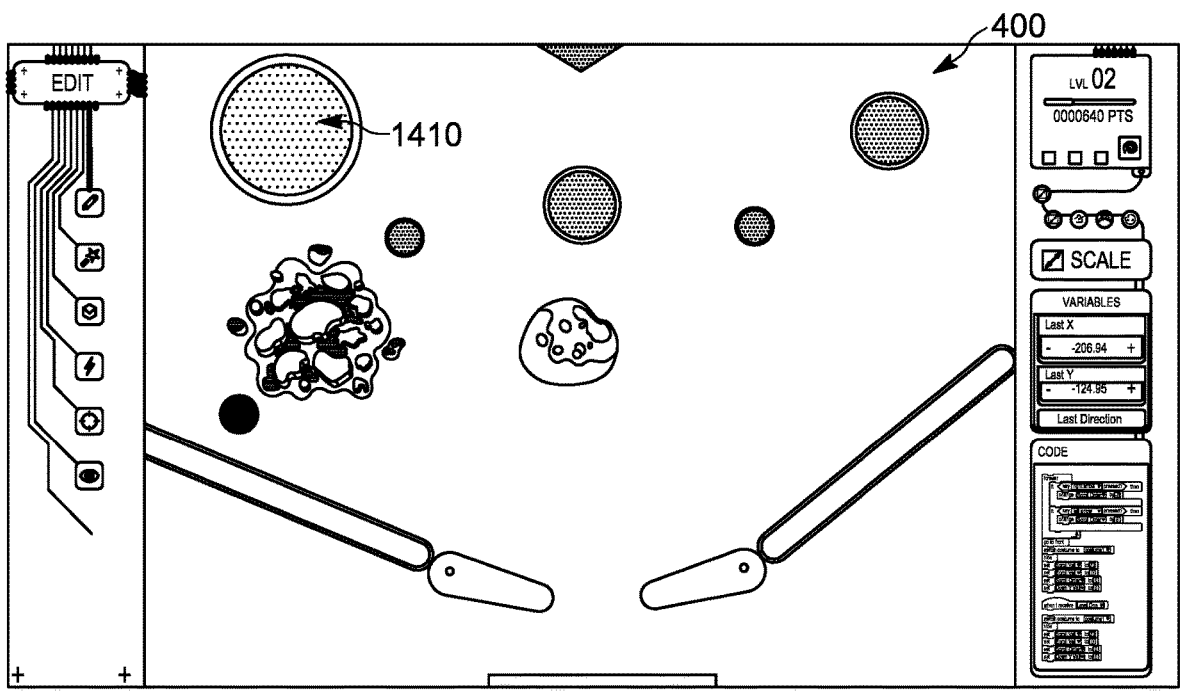

FIGS. 14A through 14E illustrate applying a glitch that changes the appearance of a selected sprite. In FIG. 14A, the electronic processor 200 receives a selection of a glitch 1400 called scale from a menu 1405 of edit type glitches and, in FIG. 14B, the electronic processor 200 receives a selection of a sprite 1410 with the cursor 1130. FIG. 14C illustrates the electronic processor 200 applying glitch code associated with the scale glitch 1400 to the new sprite 1410. FIG. 14D illustrates the electronic processor 200 receiving adjustment input at a graphic adjuster 1415 and updating the size of the sprite on the graphical gameplay interface 400 based on the size indicated by the received adjustment input. FIG. 14E illustrates the graphical gameplay interface 400 updated to include the scale glitch 1400 once the glitch mode is exited.

Figure 15A:
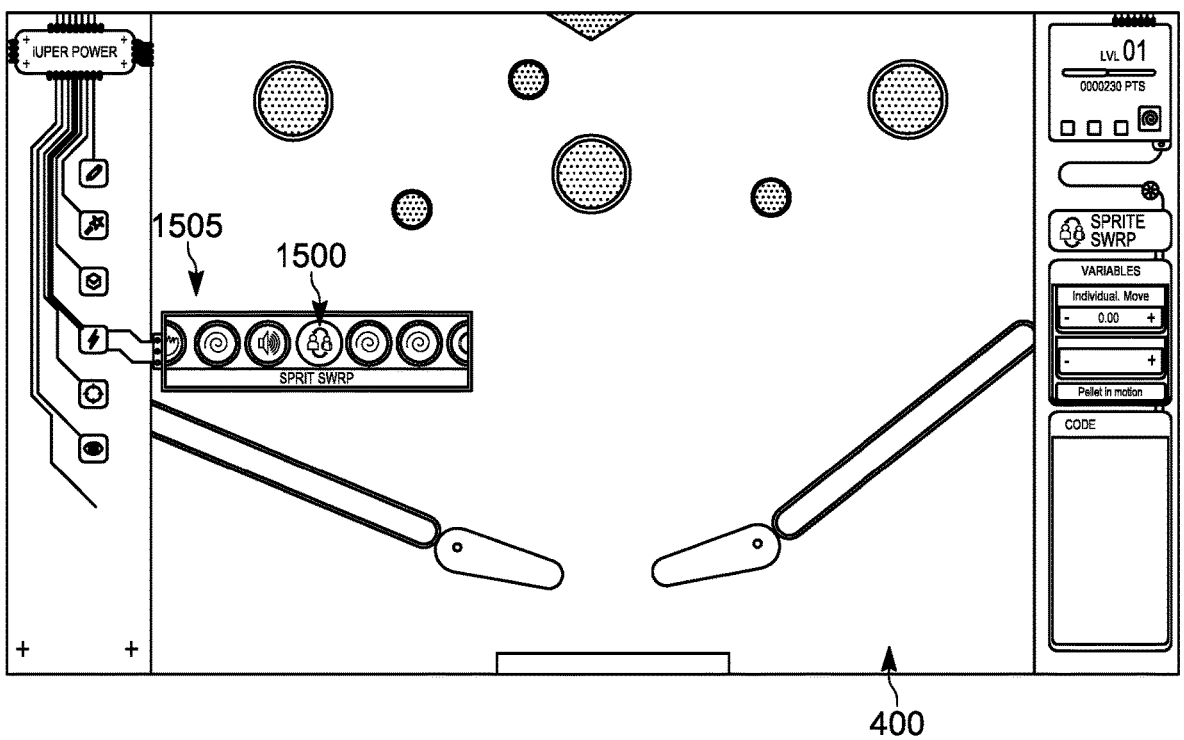
FIG. 15A through FIG. 15D illustrate an example application of a glitch that switches the physical appearance of two selected sprites.
Figure 15B:
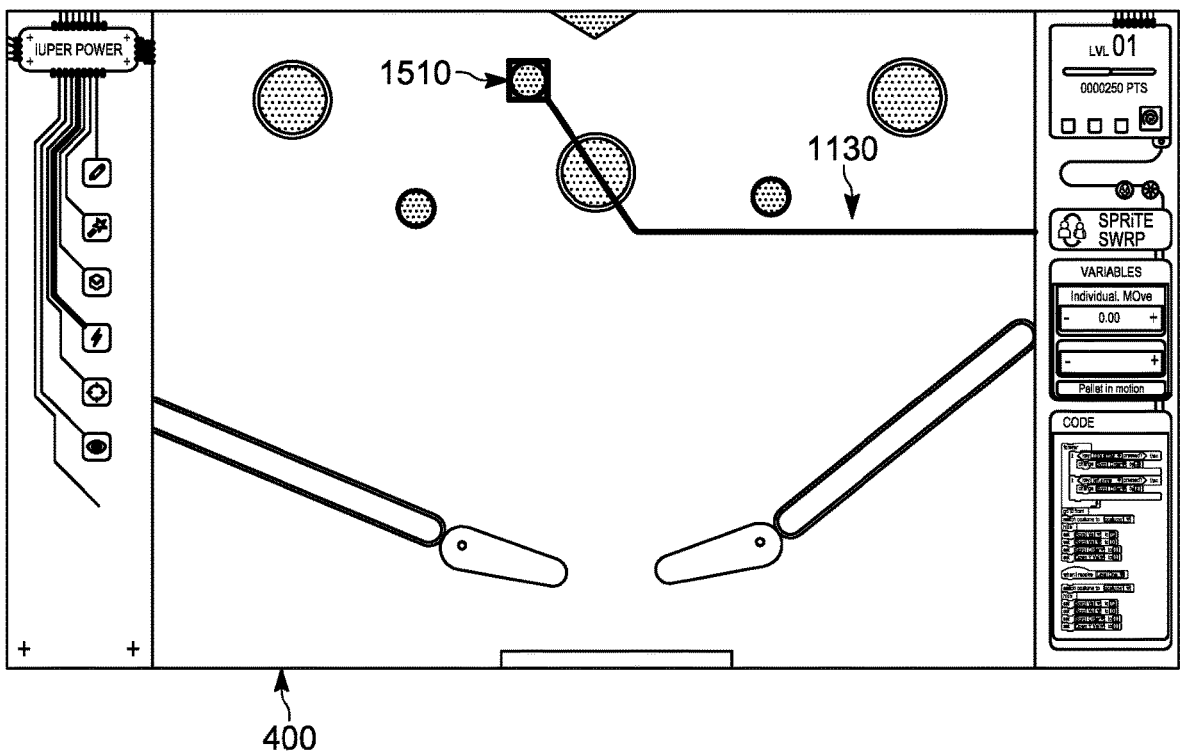
Figure 15C:
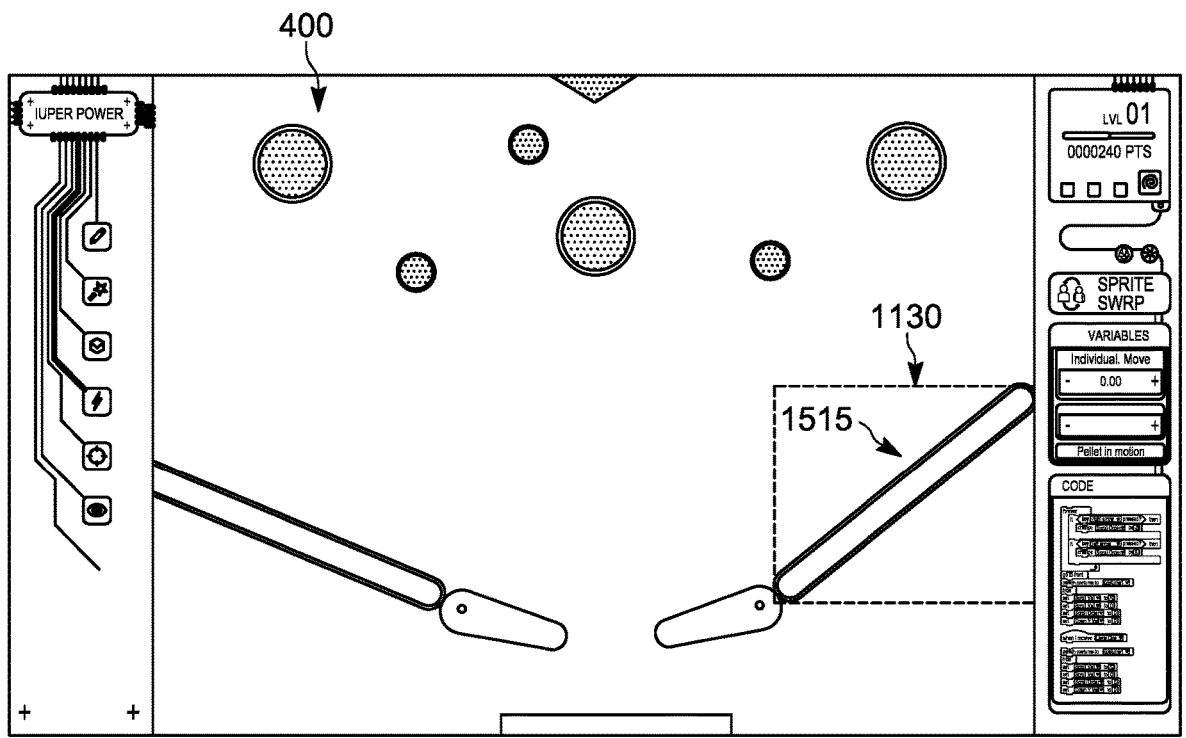
Figure 15D:
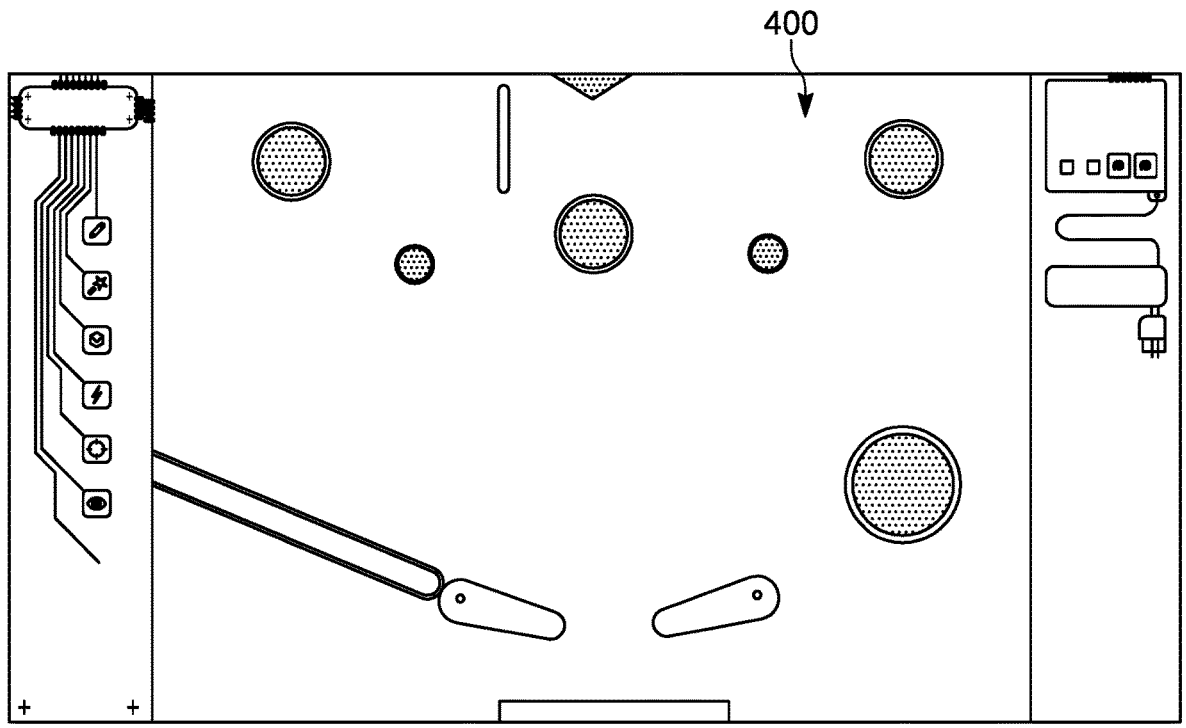

FIGS. 15A through 15D illustrate applying a glitch that switches the physical appearance of two selected sprites. In FIG. 15A, the electronic processor 200 receives a selection of a glitch 1500 called sprite appearance swap from a menu 1505 of superpower type glitches. FIG. 15B illustrates the electronic processor 200 receiving a selection of the sprite 1510, with the cursor 1130, and FIG. 15C illustrates the electronic processor 200 receiving a selection of a sprite 1515, with the cursor 1130. FIG. 15D illustrates the electronic processor 200 applying the glitch to the first game software application 235. Applying the glitch 1500 to the first game software application 235 causes the sprite 1510 and the sprite 1515 to swap physical appearances (or costumes), as shown in FIG. 15D. Therefore, what appears to be the sprite 1515 will behave as though it is the sprite 1510 and what appears to be the sprite 1515 will behave as though it is the sprite 1510. In an alternative embodiment, the location and the code of the sprite 1510 is swapped with the location and the code of the sprite 1515. Further, the actual appearance or location swap may occur in response to user input received at the controller 125 during gameplay.

In another example of a superpower-type glitch, a sound-control or visual-control glitch modifies the code of a sprite to redefine the inputs used to control the sprite. For example, initially, a sprite may be configured through code to virtually jump in response to a first button press on the controller 125. However, the sound-control glitch may modify the code of the sprite such that the sprite virtually jumps on the interface 400 in response to a particular sound captured via the microphone 120 or particular motion captured via the camera 130. For example, the electronic processor 200 is configured to receive audio data via the microphone 120, compare the audio data to a volume threshold and, when the volume threshold is exceeded, consider the captured audio data as a user gameplay input that causes the sprite to virtually jump. Thus, a user may shout, whistle, or clap, above a certain threshold, to cause the sprite to jump, or perform another action. In some embodiments, other audio analysis techniques are used (e.g., common speed recognition techniques) to detect particular words (e.g., "jump" or "shoot") from captured audio data that are associated with a control action by an implemented glitch. In response to detection of the particular words, the electronic processor 200 controls the sprite according to the control action defined in the code of the sprite, as modified by the glitch. Similarly, the electronic processor 200 is configured to receive image data via the camera 130, analyze the data using common image processing techniques to detect certain motions (e.g., a hand wave), and, when the certain motions are detected, consider the detected motion as a user gameplay input that causes the sprite to virtually jump or take another action defined in the code of the sprite, as modified by the glitch.

Figure 16A:
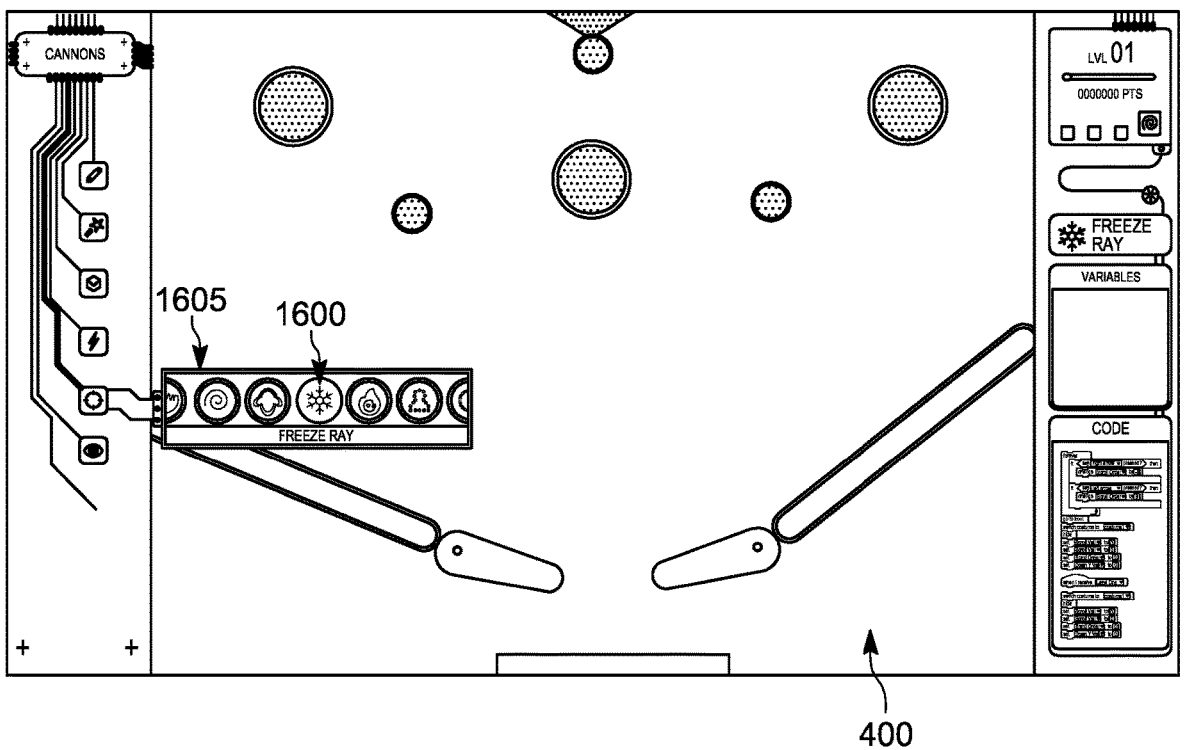
FIG. 16A through FIG. 16D illustrate an example application of a glitch that modifies a selected sprite within a game software application and other sprites included in the game software application.
Figure 16B:
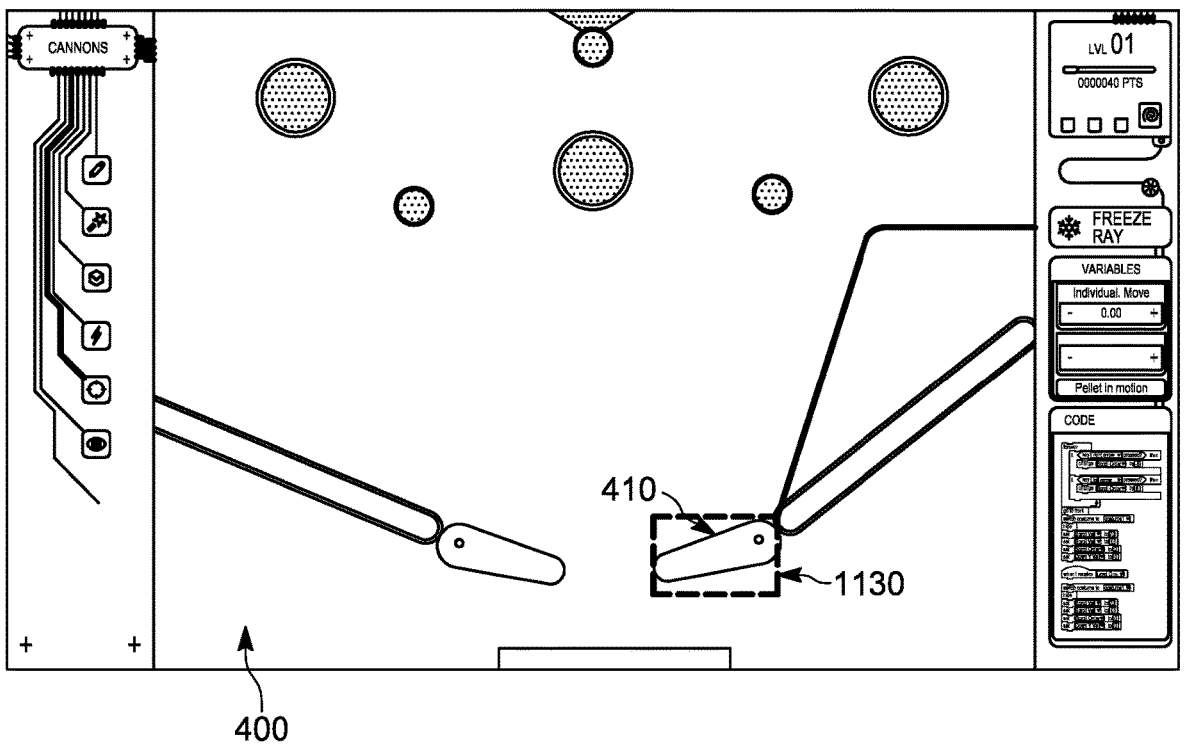
Figure 16C:
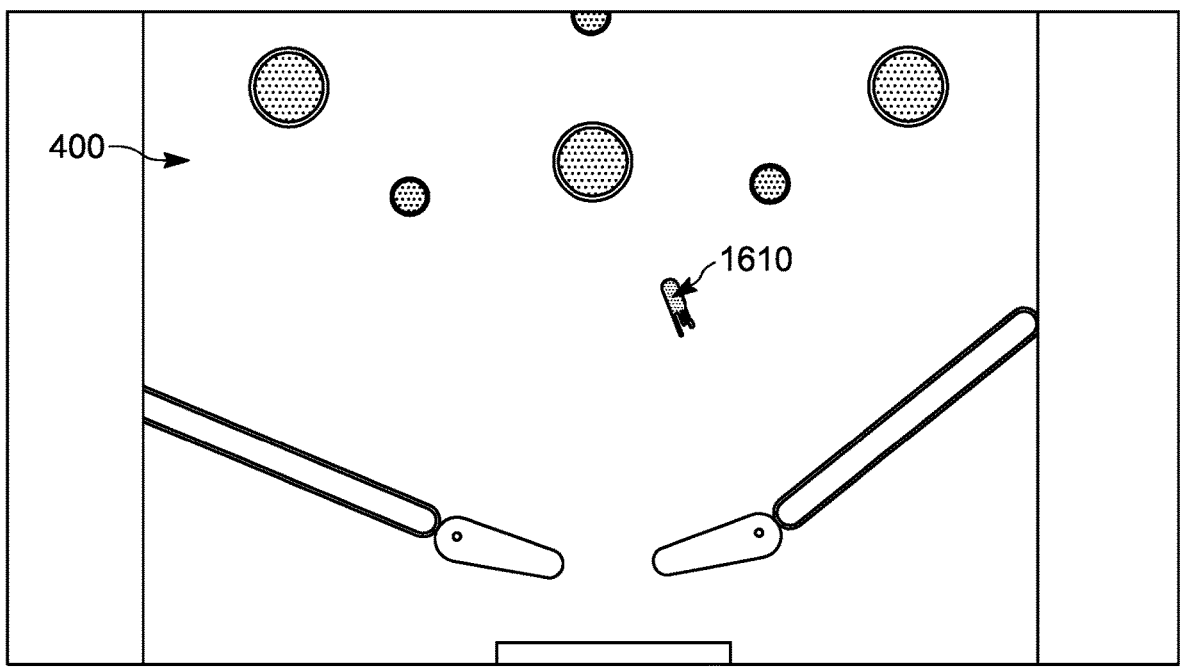
Figure 16D:
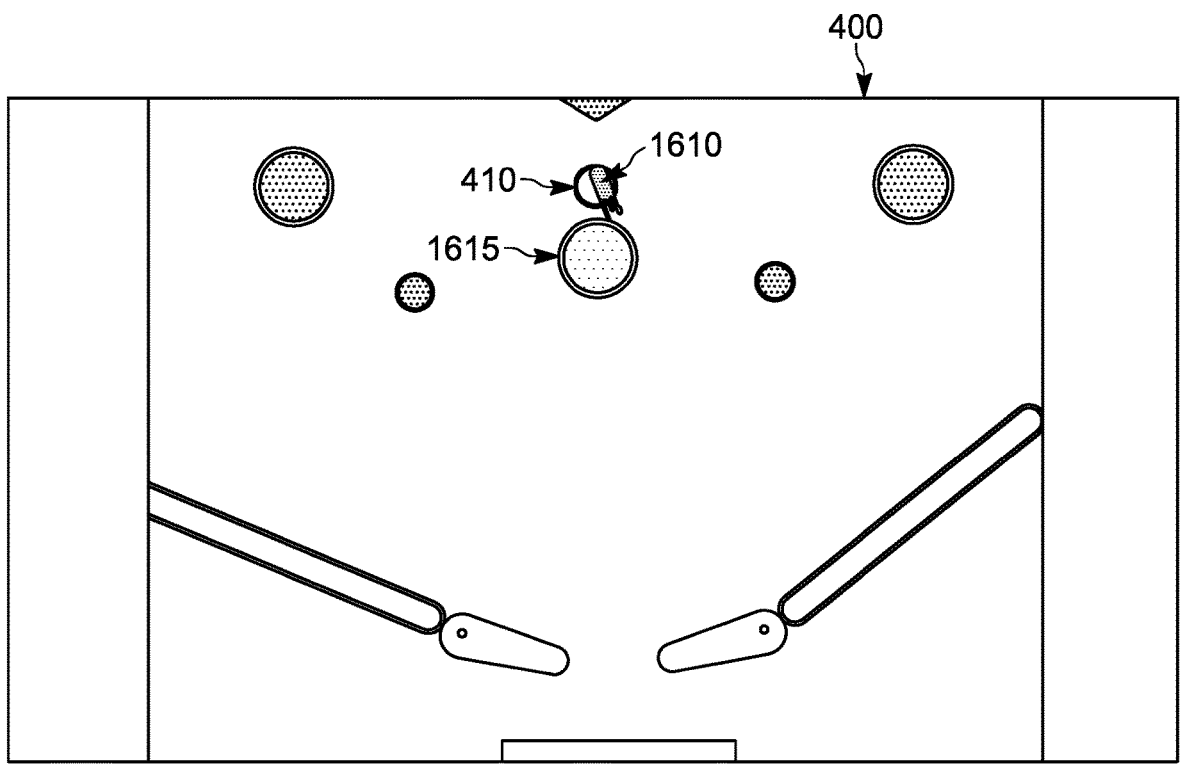

FIGS. 16A through 16D illustrate applying a glitch that gives a selected sprite an ability to emit virtual projectiles. In FIG. 16A, the electronic processor 200 receives a selection of a glitch 1605 called freeze ray from a menu 1600 of cannons type glitches. FIG. 16B illustrates the electronic processor 200 receiving a selection of the sprite 410, with the cursor 1130. When the electronic processor 200 receives the selection of the sprite 410, the electronic processor 200 modifies the code of the sprite 410 to give the sprite 410 the ability to emit virtual projectiles (for example, the virtual projectile 1610 shown in FIG. 16C) and modifies the code of all other sprites in the game software application in a way that causes sprites to become (or remain) immobile when they touch the projectile (overlap the projectile on the graphical gameplay interface 400). For example, in FIG. 16D, the virtual projectile 1610 touches the sprite 405 and a sprite 1615 causing the sprite 405 and the sprite 1615 to become immobile and remain immobile, respectively.

Figure 17A:
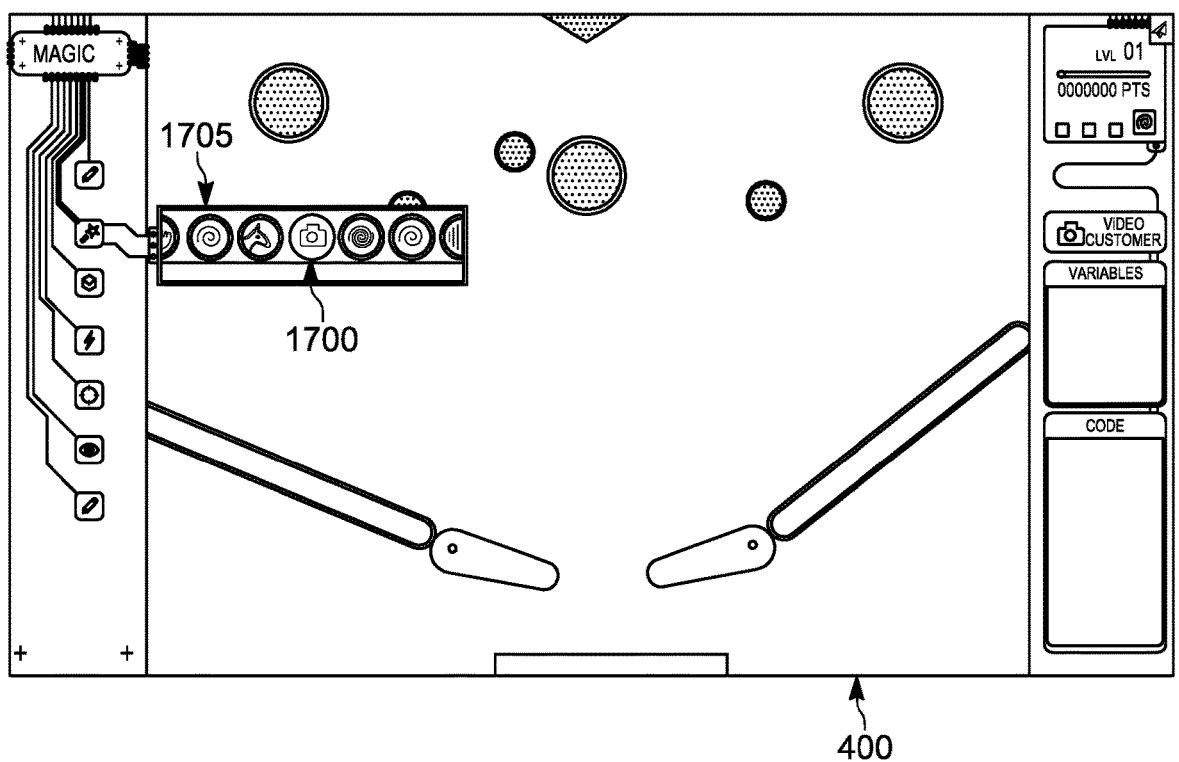
FIG. 17A through FIG. 17D illustrate an example application of a glitch that changes the graphical representation of a sprite to include an image from a camera included in the game editing system of FIG. 1.
Figure 17B:
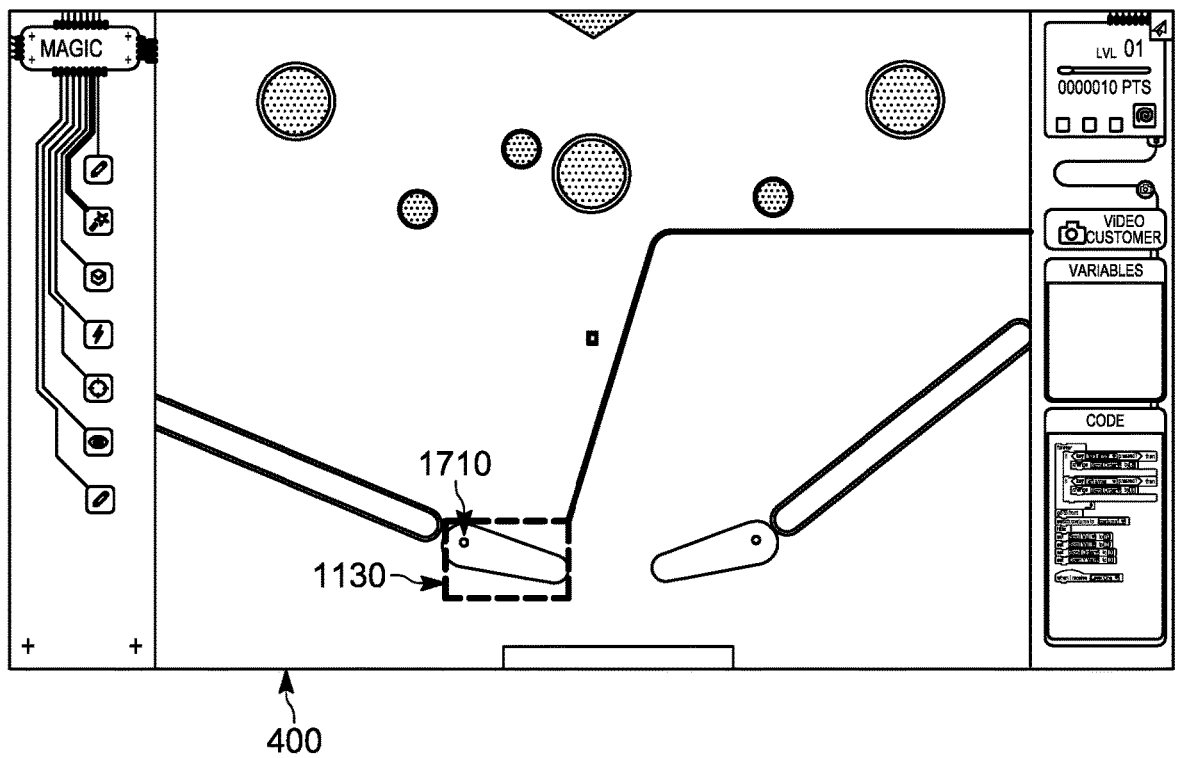
Figure 17C:
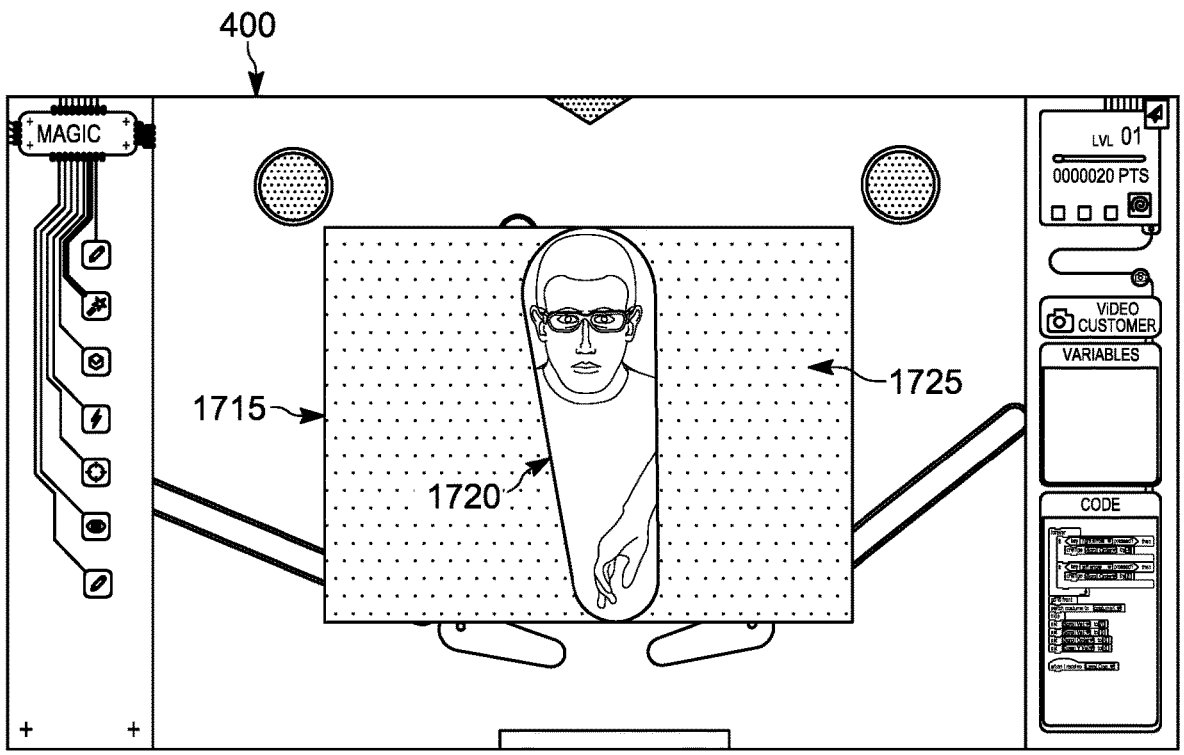
Figure 17D:
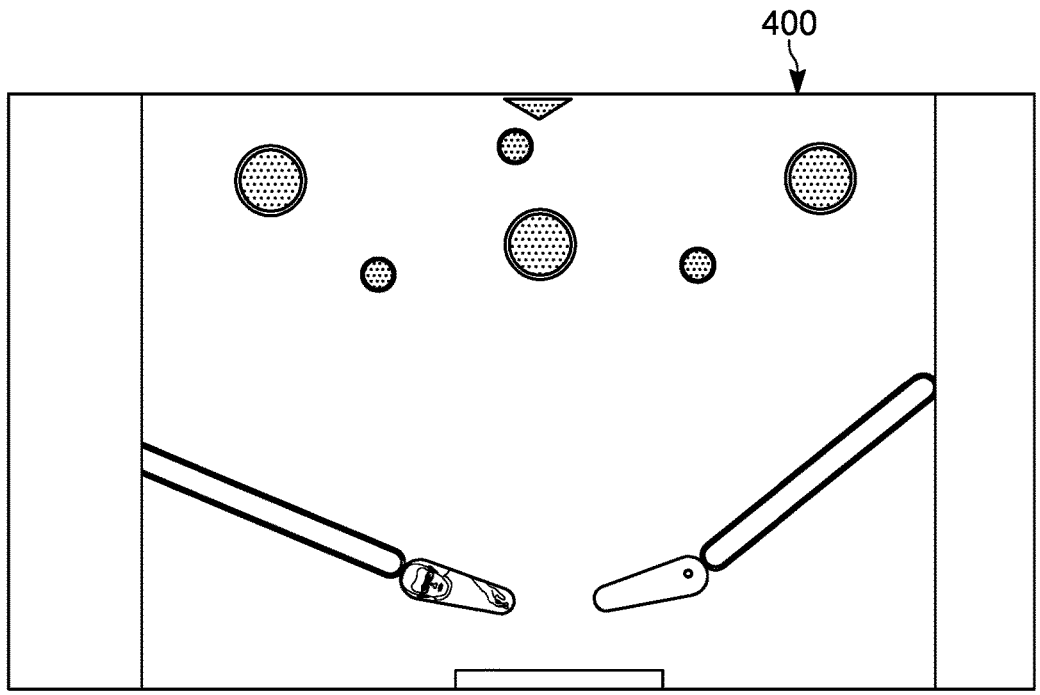

FIGS. 17A through 17D illustrate applying a glitch that replaces the graphical representation of a selected sprite with an image captured from the camera 130. In FIG. 17A, the electronic processor 200 receives a selection of a glitch 1700 called video costume from a menu 1705 of magic type glitches. FIG. 17B illustrates the electronic processor 200 receiving a selection of a sprite 1710, with the cursor 1130. As illustrated in FIG. 17C, once the electronic processor 200 receives a selection of the sprite 1710, the electronic processor 200 displays a window 1715 on the graphical gameplay interface 400. The electronic processor 200 displays, in the window 1715, an image (or image feed) 1720 from the camera 130 that matches the shape and size of the selected sprite 1710. In the example shown, an area 1725 in the window 1715 that does not display the image 1720 from the camera 130 is a solid color. In other words, the image is pre-cropped in the window 1715 to have the shape of the sprite 1710 being modified by the glitch. To do so, in one embodiment, the electronic processor 200 provides the image (or image feed) 1720 in the window 1715 as a first layer, and then generates a mask layer positioned on top of the first layer. The mask layer includes a non-masking portion (i.e., a transparent portion) in the shape of the selected sprite 1710. To generate the mask layer, the electronic processor 200 may retrieve the shape of the selected sprite 1710 from the code block defining the shape of the sprite 1710 and then define the non-masking portion of the mask layer with the retrieved shape of the sprite 1710. In other examples, the area 1725 in the window 1715 may display other graphics. When the electronic processor 200 receives an indication that the image 1720 in the window 1715 is selected from the human interface devices 110, the electronic processor 200 replaces the graphic representing the sprite 1710 with the image 1720 in the window 1715 that is the shape and size of the original graphical representation of the sprite 1710, as shown in FIG. 17D.

In some embodiments, the glitch-filter library 225 includes a sound swap glitch that associates a sound that the electronic processor 200 receives from a human interface device 110 (for example, the microphone 120) with an event on a graphical gameplay interface. As one example, in the first game software application 235, a sound is emitted from a human interface device 110 (for example, the speaker 132) when the first sprite 245 (the ball) touches another sprite in the graphical gameplay interface 400. Then, when the sound swap glitch is selected and a sound is received via the microphone 120, the electronic processor 200 replaces the sound currently emitted when the first sprite 245 touches another sprite on the graphical gameplay interface 400 with the sound received from the microphone 120. In some embodiments, the electronic processor 200 manipulates (e.g., crops, compresses, extends, or loops) the sound it receives from the microphone 120 to match a duration of the captured sound to that of the sound it is replacing.

One or more of the above glitches may also be implemented as a filter and applied to one or more sprites within a graphical gameplay interface.

Figure 18A:
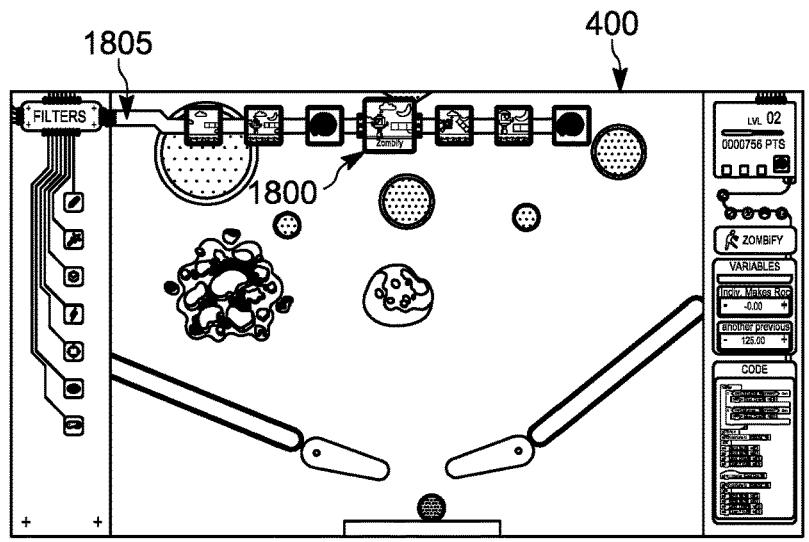
FIG. 18A through FIG. 18C illustrate an example application of a filter to a game software application.
Figure 18B:
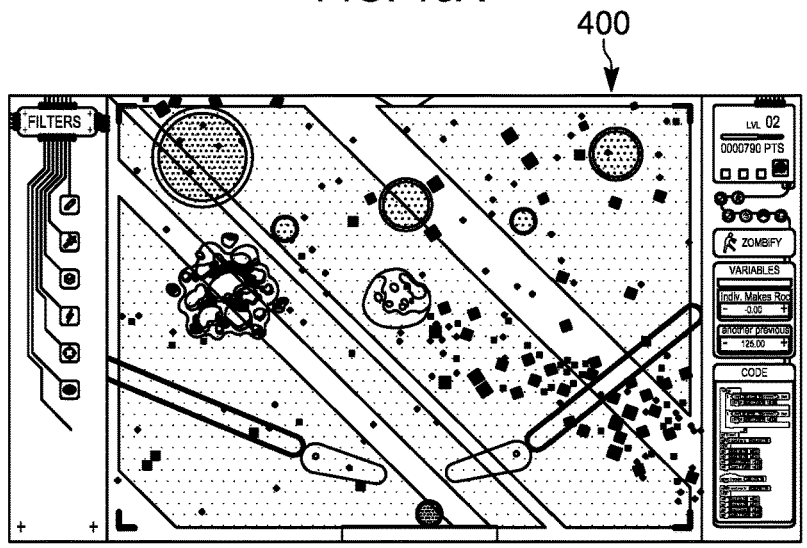
Figure 18C:
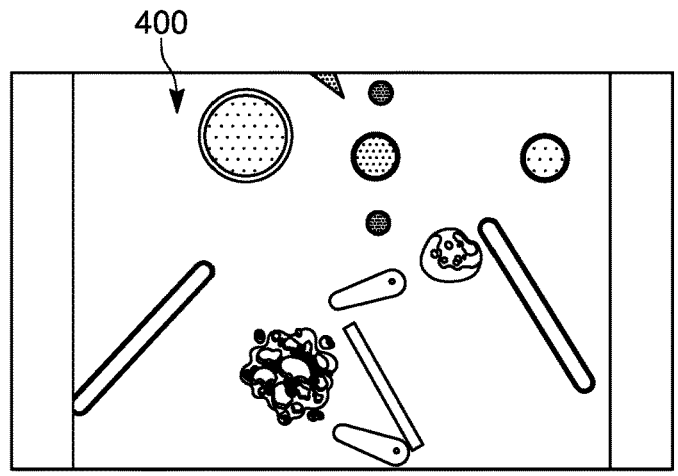

An example of an application of a filter is illustrated in FIG. 18A through FIG. 18C. FIG. 18C illustrates the electronic processor 200 receiving a selection of a filter 1800 called zombify from the filter menu 1805. As shown in FIG. 18B, once the electronic processor 200 receives the selection of the zombify filter 1800, the electronic processor 200 applies the zombify filter 1800 to the first game software application 235 by modifying the code of every sprite in the first game software application 235. The modified code causes the sprites to move around the graphical gameplay interface 400 in a random direction at a consistent speed. The results of applying the zombify filter 1800 moments after applying the filter are shown in FIG. 18C.

Figure 19A:
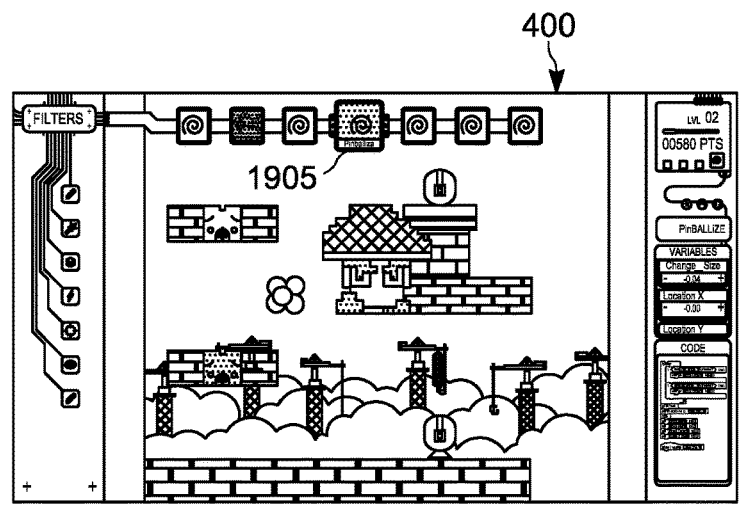
FIG. 19A through FIG. 19C illustrate an example application of multiple filters to a game software application.
Figure 19B:
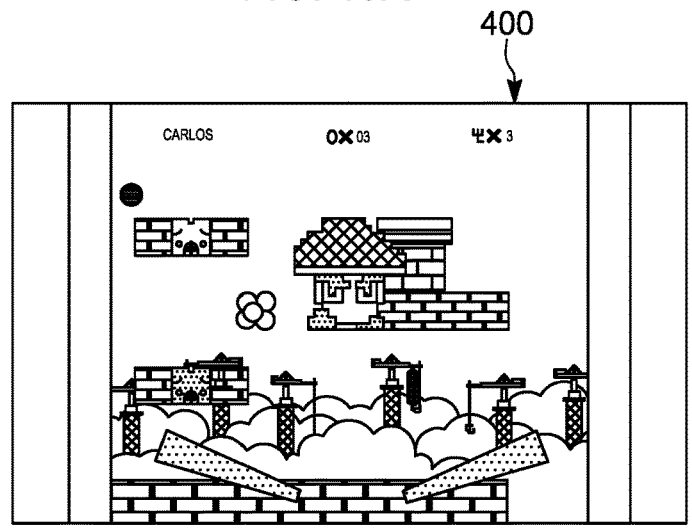
Figure 19C:
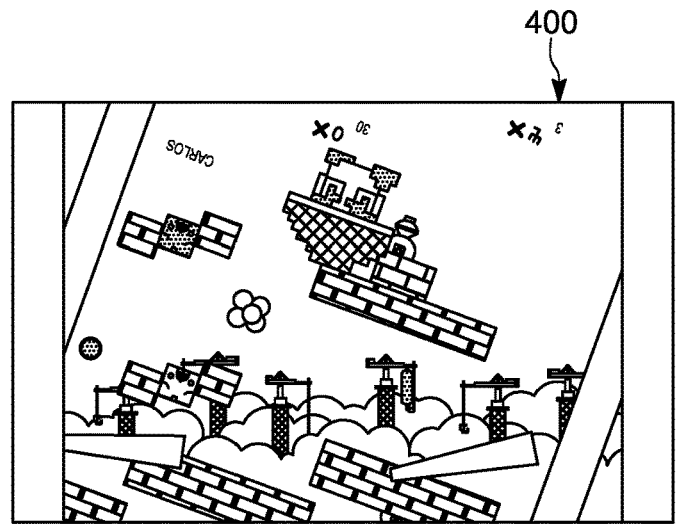

Some filters are designed to add elements of a first game software application to a second game software application currently on the graphical gameplay interface 400. For example, the electronic processor 200 may receive a selection of a filter (such as the pinballize filter 1905 selected in FIG. 19A) that modifies the behavior of a plurality of or all sprites included in a first game software application, and adds several new sprites to the game software application from a second game software application. The new sprites and the modifications to the behavior of the other sprites in the game software application impart functionality from the second game software application to the first game software application, may give the impression to the user that the games have been combined. For example, for the pinballize filter, as shown in FIG. 19B, two paddles and a pinball are added to the graphical gameplay interface. A modification is also made to the code of the other sprites in the graphical gameplay interface other than the paddles and pinball, which causes the other sprites to act as bumpers game for the added pinball.

Further, multiple filters may be applied to the game software application. For example, in FIG. 19C, the electronic processor 200 applies the zombify filter 1800 to a game software application to which the electronic processor 200 previously applied a pinballize filter.

In some embodiments, the application of a glitch to a game software application provides the ability to transfer code from one sprite to another sprite. These glitches may be referred to as code swap glitches and may further be categorized into one of the aforementioned types of glitches (e.g., edit, magic, block, superpower, or cannon). Depending on the particular code swap glitch, the sprites selected for the code swap varies, the technique used to select to sprites to swap code varies, the portion of code swapped varies, and whether the code swap is unidirectional or bidirectional varies. Below are examples of code swap glitches. The code transfers described for the various code swap glitches are implemented by the electronic processor 200.

In one example, a code swap glitch selected from the object-type glitches of the menu 1305 creates a new sprite on the screen that, when encountered by a first sprite (e.g., the sprites "touch" on the interface 400), receives code from the encountered sprite or is marked as a donor sprite. Then, when a second sprite encounters the new sprite, the code from the donor sprite is transferred to the second (recipient) sprite to modify the second sprite. The particular code transferred may modify various aspects of a sprite, for example, appearance (e.g., size or color) or behavior (e.g., speed, flying ability, jumping ability). In some embodiments, the code swap is bidirectional and code from the second sprite is also provided to the first sprite that replaces the code provided by the first sprite to the second sprite.

In another example, a code swap glitch selected from the edit-type glitches of the menu 1405 transfers code from a first selected sprite to a second selected sprite. The first and second selected sprites are, for example, selected via a cursor controlled by the controller 125 in response to user input. Again, the particular code transferred may modify various aspects of a sprite and the code swap may be bidirectional.

In another example, a code swap glitch selected from the cannon-type glitches of the menu 1605 modifies the code of a first (donor) sprite to provide a virtual shooting ability (see, e.g., FIGS. 16A-D). A second (recipient) sprite, when hit by a projectile, receives code from the first (donor) sprite. Again, the particular code transferred may modify various aspects of a sprite and the code swap may be bidirectional. In another example of a cannon-type, code swap glitch, a first (selector) sprite is modified to have a virtual shooting ability. Then, a first sprite that is hit by a projectile is marked as a donor sprite, a second sprite hit by a projectile is marked as a recipient sprite, and code is transferred from the first donor sprite to the second recipient sprite. Again, the particular code transferred may modify various aspects of a sprite and the code swap may be bidirectional.

In another example, a code swap glitch selected from the magic-type glitches of the menu 1705 may cause a sprite periodically transfers code from itself to another sprite on the graphical gameplay interface, such as the nearest sprite or a sprite previously selected as a recipient sprite. Again, the particular code transferred may modify various aspects of a sprite and the code swap may be bidirectional. Further, in another example, the transfer of code may be periodically reversed such that the sprites revert to their pre-modified versions, and then back to their modified versions.

In another example, a code swap glitch selected from the superpower-type glitches of the menu 1505 may cause a sprite to have the capability to transfer code from itself to another sprite on the graphical gameplay interface, such as the nearest sprite or a sprite previously selected as a recipient sprite, in response to an input at the controller 125. Again, the particular code transferred may modify various aspects of a sprite and the code swap may be bidirectional. Further, in another example, the transfer of code may be repeated upon each repeated input at the controller 125 (e.g., each press of a particular button) such that the code may be transferred from the sprite to a different recipient sprite upon each button press.

The glitches and filters listed in the above tables and described herein are merely examples of glitches and filters. In some embodiments, additional or fewer glitches and filters are provided by the game system 105.

It should be noted that while the above functionality is described as being performed in relation to video games, glitches and filters may be applied to other forms of media such as images, video, and animations (e.g., cartoons, animated comics, and the like).

Various features, advantages, and embodiments are set forth in the following claims.

The invention claimed is:

1. An in situ video game editing method comprising:
executing, by an electronic processor, a first game software application to generate a first graphical gameplay interface including a first sprite on a display, the first game software application defining the first sprite;
receiving, by the electronic processor, first gameplay input from a human interface device that controls gameplay of the first game software application on the first graphical gameplay interface, while the first sprite is included in the first graphical gameplay interface;
modifying the first sprite by adding a block of code to the first sprite, the block of code based on a selection, received from the human interface device, of a predetermined modification from a plurality of selectable predetermined modifications;
updating the first graphical gameplay interface to include the modified first sprite;
executing, by the electronic processor, a second game software application to generate a second graphical gameplay interface including a second sprite on the display, the second game software application defining the second sprite;
receiving, by the electronic processor, second gameplay input from the human interface device that controls gameplay of the second game software application on the second graphical gameplay interface, while the second sprite is included in the second graphical gameplay interface;
modifying the second sprite by adding the block of code to the second sprite, the block of code based on a further selection, received from the human interface device at a point after the second gameplay input is received by the electronic processor, of the predetermined modification from the plurality of selectable predetermined modifications; and updating the second graphical gameplay interface to include the modified second sprite.

2. The method of claim 1, the method further comprising: generating, by the electronic processor, a graphical editing panel overlaid on the first graphical gameplay interface such that the graphical editing panel and the first sprite are visible simultaneously on the display.

3. The method according to claim 2, further comprising: receiving, while the graphical editing panel is on the first graphical gameplay interface, a selection of a sprite via the human interface device that identifies the first sprite on the graphical gameplay interface as a selected sprite to receive the predetermined modification.

4. The method of claim 1, wherein, in response to receiving the first gameplay input, the electronic processor controls the first sprite to move within the first graphical gameplay interface.

5. The method of claim 1, wherein the first game software application defines the first sprite by defining a plurality of physical attributes of the first sprite and behaviors of the first sprite.

6. The method of claim 1, wherein modifying the first sprite by adding a block of code to the first sprite includes retrieving the block of code from a third sprite on the first graphical gameplay interface.

7. The method according to claim 1, further comprising modifying a third sprite in the first game software application in response to the selection of the predetermined modification.

8. The method according to claim 1, further comprising: identifying, by the electronic processor, a third sprite on the first graphical gameplay interface in response to at least one selected from the group of:
the third sprite being touched by a virtual projectile emitted from the first sprite with a virtual shooting ability, and
the third sprite being touched by the first sprite; and
in response to identifying the third sprite, modifying the third sprite based on the predetermined modification; and
updating the first graphical gameplay interface to include the modified third sprite.

9. An in-game video game editing system comprising:
a human interface device;
a display;
a memory storing a first game software application defining a first sprite and a second game software application defining a second sprite; and
an electronic processor communicatively coupled to the human interface device, the display, and the memory, the electronic processor configured to,
execute the first game software application to generate a first graphical gameplay interface including the first sprite on the display;
receive, while the first sprite is included in the first graphical gameplay interface, first gameplay input from the human interface device that controls gameplay of the first game software application on the first graphical gameplay interface;
modify the first sprite by adding a block of code to the first sprite, the block of code based on a selection, received from the human interface device, of a predetermined modification from a plurality of selectable predetermined modifications;
update the first graphical gameplay interface to include the modified first sprite;

execute the second game software application to generate a second graphical gameplay interface including the second sprite on the display;
receive, while the second sprite is included in the second graphical gameplay interface, second gameplay input from the human interface device that controls gameplay of the second game software application on the second graphical gameplay interface;
modify the second sprite by adding the block of code to the second sprite, the block of code based on a further selection, received from the human interface device at a point after the second gameplay input is received, of the predetermined modification from the plurality of selectable predetermined modifications; and
update the second graphical gameplay interface to include the modified second sprite.

10. The system of claim 9, wherein the system is further configured to:
generate, by the electronic processor, the graphical editing panel overlaid on the first graphical gameplay interface such that the graphical editing panel and the first sprite are visible simultaneously on the display.

11. The system of claim 10, wherein the electronic processor is further configured to:
receive, while the graphical editing panel is overlaid on the first graphical gameplay interface, a selection of a sprite via the human interface device that identifies the first sprite on the graphical gameplay interface as a selected sprite to receive the predetermined modification.

12. The system of claim 9, wherein the first game software application defines the first sprite by having code blocks that define a plurality of physical attributes of the first sprite and behaviors of the first sprite.

13. The system of claim 9, wherein, to modify the first sprite by adding a block of code to the first sprite, the electronic processor is further configured to:
retrieve a block of code from a third sprite on the first graphical gameplay interface.

14. The system according to claim 9, wherein the electronic processor is configured to modify a third sprite in the first game software application in response to the selection of the predetermined modification.

15. The system of claim 9, wherein the electronic processor is further configured to:
identify a third sprite on the first graphical gameplay interface that is at least one selected from the group of:
touched by a virtual projectile emitted from the first sprite with a virtual shooting ability, and
touched by the first sprite; and
in response to identifying the third sprite, modify the third sprite based on the predetermined modification; and
update the first graphical gameplay interface to include the modified third sprite.

16. An in situ video game editing method comprising:
executing, by an electronic processor, a game software application to generate, on a display, a graphical gameplay interface including a plurality of sprites;
receiving, by the electronic processor, a gameplay input from a human interface device for controlling gameplay of the game software application on the graphical gameplay interface;
generating, by the electronic processor, a graphical editing panel on the graphical gameplay interface;

receiving, from the human interface device, a selection of a predetermined modification included in the graphical editing panel;

determining, by the electronic processor, a type of the predetermined modification, wherein the type indicates whether the predetermined modification includes adding a new sprite and whether the predetermined modification includes selecting a sprite of the plurality of sprites on the graphical gameplay interface;

in response to the type of the predetermined modification, receiving from the human interface device, a selection of a sprite of the plurality of sprites on the graphical gameplay interface;

adding, by the electronic processor, a block of code to the selected sprite based on the predetermined modification to generate a modified sprite; and executing, by the electronic processor, the block of code to provide the modified sprite on the graphical gameplay interface.

17. The method of claim 16, further comprising:

adding, by the electronic processor, further blocks of code to other sprites of the plurality of sprites based on the predetermined modification, the further blocks defining the manner in which the other sprites interact with the modified sprite.

18. The method of claim 16, further comprising:

executing temporary code, by the electronic processor, to preview the modified sprite while the graphical editing panel is on the graphical gameplay interface;

receiving a glitch adjustment from the human interface device;

adjusting the block of code added to the selected sprite based on the glitch adjustment;

removing the graphical editing panel from the graphical gameplay interface.

* * * * *